(12) United States Patent
Merrill et al.

(10) Patent No.: US 10,408,079 B2
(45) Date of Patent: Sep. 10, 2019

(54) FORMING COOLING PASSAGES IN THERMAL BARRIER COATED, COMBUSTION TURBINE SUPERALLOY COMPONENTS

(71) Applicant: Siemens Aktiengesellschaft, München (DE)

(72) Inventors: Gary B. Merrill, Orlando, FL (US); Jonathan E. Shipper, Jr., Lake Mary, FL (US); Cora Hitchman, Charlotte, NC (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 230 days.

(21) Appl. No.: 15/550,931

(22) PCT Filed: Feb. 17, 2016

(86) PCT No.: PCT/US2016/018209
§ 371 (c)(1),
(2) Date: Aug. 14, 2017

(87) PCT Pub. No.: WO2016/133982
PCT Pub. Date: Aug. 25, 2016

(65) Prior Publication Data
US 2018/0023399 A1 Jan. 25, 2018

Related U.S. Application Data

(63) Continuation of application No. PCT/US2015/016318, filed on Feb. 18, 2015.

(51) Int. Cl.
*F01D 11/12* (2006.01)
*F01D 5/18* (2006.01)
(Continued)

(52) U.S. Cl.
CPC .............. *F01D 11/122* (2013.01); *B22C 7/02* (2013.01); *B22C 9/24* (2013.01); *B22D 25/02* (2013.01);
(Continued)

(58) Field of Classification Search
CPC ...... F01D 11/122; F01D 11/08; F01D 11/127; F01D 5/18; F01D 5/14; F01D 5/28;
(Continued)

(56) References Cited

U.S. PATENT DOCUMENTS

| | | | |
|---|---|---|---|
| 1,061,206 A | 5/1913 | Nikola | |
| 3,867,061 A | 2/1975 | Moskowitz | |

(Continued)

FOREIGN PATENT DOCUMENTS

| | | |
|---|---|---|
| CN | 101845969 A | 9/2010 |
| DE | 2612210 B1 | 9/1977 |

(Continued)

OTHER PUBLICATIONS

PCT International Search Report and Written Opinion dated May 23, 2016 corresponding to PCT Application No. PCT/US2016/018209 filed Feb. 17, 2016.

*Primary Examiner* — Moshe Wilensky

(57) ABSTRACT

Delamination of thermal barrier coatings ("TBC's") (276) from superalloy substrates (262) of components (260) for turbine engines (80), such as engine blades (92), vanes (104, 106), or castings in transitions (85), is inhibited during subsequent cooling passage (270) formation. Partially completed cooling passages (264), which have skewed passage paths that end at a terminus (268), which is laterally offset from the passage entrance (266), are formed in the superalloy component (260) prior to application of the TBC layer(s) (276). The skewed, laterally offset path of each partially completed cooling passage (264) establishes an (Continued)

overhanging shield layer (269) of superalloy material that protects the TBC layer (276) during completion of the cooling passage (270).

20 Claims, 11 Drawing Sheets

(51) Int. Cl.
| | |
|---|---|
| F01D 5/28 | (2006.01) |
| F01D 5/14 | (2006.01) |
| B23K 26/382 | (2014.01) |
| B23H 1/00 | (2006.01) |
| B23P 15/02 | (2006.01) |
| B22C 7/02 | (2006.01) |
| B22C 9/24 | (2006.01) |
| B22D 25/02 | (2006.01) |
| B22D 29/00 | (2006.01) |
| C23C 4/02 | (2006.01) |
| C23C 4/18 | (2006.01) |
| C23C 28/00 | (2006.01) |
| F01D 11/08 | (2006.01) |
| F04D 29/52 | (2006.01) |
| F04D 29/68 | (2006.01) |
| C23C 4/073 | (2016.01) |

(52) U.S. Cl.
CPC ............. *B22D 29/001* (2013.01); *B23H 1/00* (2013.01); *B23K 26/382* (2015.10); *B23P 15/02* (2013.01); *C23C 4/02* (2013.01); *C23C 4/073* (2016.01); *C23C 4/18* (2013.01); *C23C 28/3215* (2013.01); *C23C 28/3455* (2013.01); *F01D 5/14* (2013.01); *F01D 5/18* (2013.01); *F01D 5/186* (2013.01); *F01D 5/28* (2013.01); *F01D 5/288* (2013.01); *F01D 11/08* (2013.01); *F01D 11/127* (2013.01); *F04D 29/526* (2013.01); *F04D 29/685* (2013.01); *F05D 2230/10* (2013.01); *F05D 2230/30* (2013.01); *F05D 2230/90* (2013.01); *F05D 2250/12* (2013.01); *F05D 2250/15* (2013.01); *F05D 2250/182* (2013.01); *F05D 2250/183* (2013.01); *F05D 2250/184* (2013.01); *F05D 2250/185* (2013.01); *F05D 2250/23* (2013.01); *F05D 2250/282* (2013.01); *F05D 2250/292* (2013.01); *F05D 2250/294* (2013.01); *F05D 2250/75* (2013.01); *F05D 2260/202* (2013.01); *F05D 2260/22141* (2013.01); *F05D 2300/175* (2013.01); *F05D 2300/611* (2013.01)

(58) Field of Classification Search
CPC ........ F01D 5/288; F01D 5/186; F04D 29/526; F04D 29/685; B23P 15/02; C23C 4/073; C23C 4/18; C23C 4/02; C23C 28/3455; C23C 28/3215; B22D 29/001; B22D 25/02; B22C 9/24; B22C 7/02; B23H 1/00; B23K 26/382
See application file for complete search history.

(56) References Cited

U.S. PATENT DOCUMENTS

| | | |
|---|---|---|
| 3,970,319 A | 7/1976 | Carroll et al. |
| 4,028,523 A | 6/1977 | Anderl et al. |
| 4,152,223 A | 5/1979 | Borstein et al. |
| 4,197,443 A | 4/1980 | Sidenstick |
| 4,289,447 A | 9/1981 | Sterman et al. |
| 4,303,693 A | 12/1981 | Driver |
| 4,321,310 A | 3/1982 | Ulion et al. |
| 4,335,190 A | 6/1982 | Bill et al. |
| 4,405,284 A | 9/1983 | Albrecht et al. |
| 4,414,249 A | 11/1983 | Ulion et al. |
| 4,466,772 A | 8/1984 | Okapuu et al. |
| 4,514,469 A | 4/1985 | Loersch et al. |
| 4,526,509 A | 7/1985 | Gay et al. |
| 4,594,053 A | 6/1986 | Soehngen |
| 4,639,388 A | 1/1987 | Ainsworth et al. |
| 4,714,406 A | 12/1987 | Hough |
| 4,764,089 A | 8/1988 | Strangman |
| 4,810,334 A | 3/1989 | Honey et al. |
| 4,885,213 A | 12/1989 | Miyamoto et al. |
| 5,057,379 A | 10/1991 | Fayeulle et al. |
| 5,064,727 A | 11/1991 | Naik et al. |
| 5,124,006 A | 6/1992 | Fayeulle et al. |
| 5,167,721 A | 12/1992 | Mccomas et al. |
| 5,236,745 A | 8/1993 | Gupta et al. |
| 5,352,540 A | 10/1994 | Schienle et al. |
| 5,403,669 A | 4/1995 | Gupta et al. |
| 5,435,889 A | 7/1995 | Dietrich |
| 5,486,093 A | 1/1996 | Auxier et al. |
| 5,514,445 A | 5/1996 | Delage et al. |
| 5,534,308 A | 7/1996 | Bamberg et al. |
| 5,579,534 A | 11/1996 | Itoh et al. |
| 5,645,893 A | 7/1997 | Rickerby et al. |
| 5,681,616 A | 10/1997 | Gupta et al. |
| 5,716,720 A | 2/1998 | Murphy |
| 5,721,057 A | 2/1998 | Bamberg et al. |
| 5,723,078 A | 3/1998 | Nagaraj et al. |
| 5,817,371 A | 10/1998 | Gupta et al. |
| 5,817,372 A | 10/1998 | Zheng |
| 5,866,271 A | 2/1999 | Stueber et al. |
| 5,894,053 A | 4/1999 | Fried |
| 5,900,283 A | 5/1999 | Vakil et al. |
| 5,951,892 A | 9/1999 | Wolfla et al. |
| 5,952,110 A | 9/1999 | Schell et al. |
| 5,985,470 A | 11/1999 | Spitsberg et al. |
| 6,074,706 A | 6/2000 | Beverley et al. |
| 6,096,381 A | 8/2000 | Zheng |
| 6,102,656 A | 8/2000 | Nissley et al. |
| 6,106,959 A | 8/2000 | Vance et al. |
| 6,136,453 A | 10/2000 | Ritter et al. |
| 6,155,778 A | 12/2000 | Lee et al. |
| 6,159,553 A | 12/2000 | Li et al. |
| 6,165,628 A | 12/2000 | Borom et al. |
| 6,171,351 B1 | 1/2001 | Schroder et al. |
| 6,203,021 B1 | 3/2001 | Wolfla et al. |
| 6,224,963 B1 | 5/2001 | Strangman |
| 6,231,998 B1 | 5/2001 | Bowker et al. |
| 6,235,370 B1 | 5/2001 | Merrill et al. |
| 6,242,050 B1 | 6/2001 | Ritter et al. |
| 6,243,948 B1 | 6/2001 | Lee et al. |
| 6,251,526 B1 | 6/2001 | Staub |
| 6,264,766 B1 | 7/2001 | Ritter et al. |
| 6,274,201 B1 | 8/2001 | Borom et al. |
| 6,316,078 B1 | 11/2001 | Smialek |
| 6,361,878 B2 | 3/2002 | Ritter et al. |
| 6,368,727 B1 | 4/2002 | Ritter et al. |
| 6,387,527 B1 | 5/2002 | Hasz et al. |
| 6,440,575 B1 | 8/2002 | Heimberg et al. |
| 6,444,331 B2 | 9/2002 | Ritter et al. |
| 6,457,939 B2 | 10/2002 | Chasripoor et al. |
| 6,471,881 B1 | 10/2002 | Chai et al. |
| 6,482,469 B1 | 11/2002 | Spitsberg et al. |
| 6,485,845 B1 | 11/2002 | Wustman et al. |
| 6,503,574 B1 | 1/2003 | Skelly et al. |
| 6,527,509 B2 | 3/2003 | Kurokawa et al. |
| 6,541,075 B2 | 4/2003 | Hasz et al. |
| 6,582,189 B2 | 6/2003 | Irie et al. |
| 6,607,789 B1 | 8/2003 | Rigney et al. |
| 6,637,643 B2 | 10/2003 | Hasz et al. |
| 6,641,907 B1 | 11/2003 | Merrill et al. |
| 6,652,227 B2 | 11/2003 | Fried |
| 6,716,539 B2 | 4/2004 | Subramanian |
| 6,720,087 B2 | 4/2004 | Fried et al. |
| 6,764,771 B1 | 7/2004 | Heimberg et al. |
| 6,812,471 B2 | 11/2004 | Popiolkowski et al. |
| 6,821,578 B2 | 11/2004 | Beele |
| 6,830,428 B2 | 12/2004 | Le et al. |

(56) References Cited

U.S. PATENT DOCUMENTS

| | | |
|---|---|---|
| 6,846,574 B2 | 1/2005 | Subramanian |
| 6,881,029 B2 | 4/2005 | Le et al. |
| 6,887,528 B2 | 5/2005 | Lau et al. |
| 6,887,595 B1 | 5/2005 | Darolia et al. |
| 6,905,305 B2 | 6/2005 | James |
| 7,001,679 B2 | 2/2006 | Campbell et al. |
| 7,029,232 B2 | 4/2006 | Tuffs et al. |
| 7,029,721 B2 | 4/2006 | Hasz et al. |
| 7,090,894 B2 | 8/2006 | Carper et al. |
| 7,150,921 B2 | 12/2006 | Nelson et al. |
| 7,172,820 B2 | 2/2007 | Darolia et al. |
| 7,182,580 B2 | 2/2007 | Bostanjoglo et al. |
| 7,182,581 B2 | 2/2007 | Bostanjoglo et al. |
| 7,210,905 B2 | 5/2007 | Lapworth |
| 7,220,458 B2 | 5/2007 | Hollis et al. |
| 7,250,222 B2 | 7/2007 | Halberstadt et al. |
| 7,273,351 B2 | 9/2007 | Kopmels |
| 7,338,250 B2 | 3/2008 | Martindale et al. |
| 7,338,719 B2 | 3/2008 | Quadakkers et al. |
| 7,378,132 B2 | 5/2008 | Renteria et al. |
| 7,402,347 B2 | 7/2008 | Morrison et al. |
| 7,462,378 B2 | 12/2008 | Nowak et al. |
| 7,479,328 B2 | 1/2009 | Roth-Fagaraseanu et al. |
| 7,507,484 B2 | 3/2009 | Kulkarni et al. |
| 7,509,735 B2 | 3/2009 | Philip et al. |
| 7,510,376 B2 | 3/2009 | Lee et al. |
| 7,510,743 B2 | 3/2009 | Subramanian |
| 7,600,968 B2 | 10/2009 | Nelson et al. |
| 7,614,847 B2 | 11/2009 | Nelson et al. |
| 7,686,570 B2 | 3/2010 | Allen |
| 7,704,596 B2 | 4/2010 | Merrill et al. |
| 7,723,249 B2 | 5/2010 | Doesburg et al. |
| 7,736,704 B2 | 6/2010 | Chandra et al. |
| 7,789,626 B1 | 9/2010 | Liang |
| 7,819,625 B2 | 10/2010 | Merrill et al. |
| 7,871,244 B2 | 1/2011 | Marini et al. |
| 7,935,413 B2 | 5/2011 | Stamm |
| 7,955,708 B2 | 6/2011 | Doesburg et al. |
| 7,968,144 B2 | 6/2011 | James et al. |
| 8,007,246 B2 | 8/2011 | Rowe et al. |
| 8,021,742 B2 | 9/2011 | Anoshkina et al. |
| 8,061,978 B2 | 11/2011 | Tholen et al. |
| 8,061,979 B1 | 11/2011 | Liang |
| 8,079,806 B2 | 12/2011 | Tholen et al. |
| 8,100,629 B2 | 1/2012 | Lebret |
| 8,123,466 B2 | 2/2012 | Pietraszkiewicz et al. |
| 8,124,252 B2 | 2/2012 | Cybulsky et al. |
| 8,137,820 B2 | 3/2012 | Fairbourn |
| 8,177,494 B2 | 5/2012 | Ward et al. |
| 8,209,831 B2 | 7/2012 | Boehm et al. |
| 8,303,247 B2 | 11/2012 | Schlichting et al. |
| 8,317,473 B1 | 11/2012 | Liang |
| 8,376,697 B2 | 2/2013 | Wiebe et al. |
| 8,388,309 B2 | 3/2013 | Marra et al. |
| 8,449,254 B2 | 5/2013 | Devore et al. |
| 8,453,327 B2 | 6/2013 | Allen |
| 8,506,243 B2 | 8/2013 | Stock et al. |
| 8,511,993 B2 | 8/2013 | Kemppainen et al. |
| 8,535,783 B2 | 9/2013 | Lutjen et al. |
| 8,586,172 B2 | 11/2013 | Rosenzweig et al. |
| 8,678,771 B2 | 3/2014 | Merrill et al. |
| 8,770,926 B2 | 7/2014 | Guo et al. |
| 8,813,824 B2 | 8/2014 | Appleby et al. |
| 8,938,716 B2 | 1/2015 | Graf et al. |
| 8,939,705 B1 | 1/2015 | Lee et al. |
| 8,939,707 B1 | 1/2015 | Lee et al. |
| 9,057,277 B2 | 6/2015 | Appleby et al. |
| 9,151,175 B2 | 10/2015 | Tham et al. |
| 2003/0039764 A1 | 2/2003 | Burns et al. |
| 2003/0054108 A1 | 3/2003 | Beele |
| 2003/0101587 A1 | 6/2003 | Rigney et al. |
| 2003/0175116 A1 | 9/2003 | Le et al. |
| 2004/0256504 A1 | 12/2004 | Segrest et al. |
| 2004/0265120 A1 | 12/2004 | Tuffs et al. |
| 2005/0003172 A1 | 1/2005 | Wheeler et al. |
| 2005/0036892 A1 | 2/2005 | Bajan |
| 2005/0135923 A1 | 6/2005 | Coons et al. |
| 2005/0164027 A1 | 7/2005 | Lau et al. |
| 2005/0178126 A1 | 8/2005 | Young et al. |
| 2005/0228098 A1 | 10/2005 | Skoog et al. |
| 2005/0249602 A1 | 11/2005 | Freling et al. |
| 2005/0260434 A1 | 11/2005 | Nelson et al. |
| 2005/0266163 A1 | 12/2005 | Wortman et al. |
| 2006/0105182 A1 | 5/2006 | Brueckner et al. |
| 2006/0110248 A1 | 5/2006 | Nelson et al. |
| 2006/0162893 A1 | 7/2006 | Beck et al. |
| 2007/0110900 A1 | 5/2007 | Nowak et al. |
| 2007/0160859 A1 | 7/2007 | Darolia et al. |
| 2007/0178247 A1 | 8/2007 | Bucci et al. |
| 2008/0005903 A1 | 1/2008 | Trindade et al. |
| 2008/0044273 A1 | 2/2008 | Khalid |
| 2008/0057214 A1 | 3/2008 | Fagoaga et al. |
| 2008/0145643 A1 | 6/2008 | Reynolds et al. |
| 2008/0145694 A1 | 6/2008 | Bucci |
| 2008/0206542 A1 | 8/2008 | Vance et al. |
| 2008/0260523 A1 | 10/2008 | Alvanos et al. |
| 2008/0274336 A1 | 11/2008 | Merrill et al. |
| 2009/0017260 A1 | 1/2009 | Kulkarni et al. |
| 2009/0162670 A1 | 6/2009 | Lau et al. |
| 2009/0274549 A1 | 11/2009 | Mitchell et al. |
| 2009/0311416 A1 | 12/2009 | Nelson et al. |
| 2009/0324401 A1 | 12/2009 | Calla |
| 2010/0003894 A1 | 1/2010 | Miller et al. |
| 2010/0104773 A1 | 4/2010 | Neal et al. |
| 2010/0136254 A1 | 6/2010 | Darolia et al. |
| 2010/0143655 A1 | 6/2010 | Rosenzweig et al. |
| 2011/0003119 A1 | 1/2011 | Doesburg et al. |
| 2011/0014060 A1 | 1/2011 | Bolcavage et al. |
| 2011/0044821 A1 | 2/2011 | Rowe et al. |
| 2011/0048017 A1 | 3/2011 | Margolies et al. |
| 2011/0076413 A1 | 3/2011 | Margolies et al. |
| 2011/0097538 A1 | 4/2011 | Bolcavage et al. |
| 2011/0116920 A1 | 5/2011 | Stock et al. |
| 2011/0132562 A1 | 6/2011 | Merrill et al. |
| 2011/0132564 A1 | 6/2011 | Merrill et al. |
| 2011/0143163 A1 | 6/2011 | Halberstadt et al. |
| 2011/0151219 A1 | 6/2011 | Nagaraj et al. |
| 2011/0182720 A1 | 7/2011 | Kojima et al. |
| 2012/0063881 A1 | 3/2012 | Tallman |
| 2012/0087803 A1 | 4/2012 | Butler et al. |
| 2012/0107103 A1 | 5/2012 | Kojima et al. |
| 2012/0272653 A1 | 11/2012 | Merrill et al. |
| 2012/0275908 A1 | 11/2012 | Guo et al. |
| 2012/0295061 A1 | 11/2012 | Bunker et al. |
| 2013/0004305 A1 | 1/2013 | Giovannetti et al. |
| 2013/0017072 A1 | 1/2013 | Ali et al. |
| 2013/0034661 A1 | 2/2013 | Schneiderbanger et al. |
| 2013/0052037 A1 | 2/2013 | Abdel-Messeh et al. |
| 2013/0052415 A1 | 2/2013 | Burns et al. |
| 2013/0122259 A1 | 5/2013 | Lee et al. |
| 2013/0186304 A1 | 7/2013 | Pabla et al. |
| 2013/0189085 A1 | 7/2013 | Werner et al. |
| 2013/0189441 A1 | 7/2013 | Pabla et al. |
| 2013/0302141 A1 | 11/2013 | Quach et al. |
| 2014/0127005 A1 | 5/2014 | Schreiber |
| 2014/0241938 A1 | 8/2014 | Merrill et al. |
| 2014/0271129 A1 | 9/2014 | Mueller et al. |
| 2015/0240652 A1 | 8/2015 | Lee et al. |
| 2015/0240653 A1 | 8/2015 | Lee et al. |

FOREIGN PATENT DOCUMENTS

| | | |
|---|---|---|
| DE | 4238369 A1 | 5/1994 |
| DE | 10057187 A1 | 5/2002 |
| DE | 10117127 A1 | 10/2002 |
| DE | 10124398 A1 | 11/2002 |
| DE | 10241741 A1 | 3/2004 |
| DE | 10357180 A1 | 6/2005 |
| DE | 102005050873 A1 | 4/2007 |
| DE | 102009011913 A1 | 9/2010 |
| DE | 102011004503 A1 | 8/2012 |
| DE | 102011077620 A1 | 12/2012 |
| EP | 0207799 A2 | 1/1987 |
| EP | 0816526 A2 | 1/1998 |

(56) References Cited

FOREIGN PATENT DOCUMENTS

| | | | |
|---|---|---|---|
| EP | 0944767 | A1 | 9/1999 |
| EP | 1217089 | A2 | 6/2002 |
| EP | 1260608 | A1 | 11/2002 |
| EP | 1304395 | A1 | 4/2003 |
| EP | 1375825 | A1 | 2/2004 |
| EP | 1491657 | A1 | 12/2004 |
| EP | 1491658 | A1 | 12/2004 |
| EP | 1522604 | A1 | 4/2005 |
| EP | 2140973 | A1 | 1/2010 |
| EP | 2202328 | A1 | 6/2010 |
| EP | 2275645 | A2 | 1/2011 |
| EP | 2434102 | A2 | 3/2012 |
| EP | 2439377 | A2 | 4/2012 |
| EP | 2589872 | A2 | 5/2013 |
| EP | 2644836 | A2 | 10/2013 |
| EP | 2777842 | A1 | 9/2014 |
| GB | 2146707 | A | 4/1985 |
| GB | 2222179 | A | 2/1990 |
| WO | 9943861 | A1 | 9/1999 |
| WO | 2005038074 | A1 | 4/2005 |
| WO | 2008103163 | A2 | 8/2008 |
| WO | 2011085376 | A1 | 7/2011 |
| WO | 2012160586 | A1 | 11/2012 |
| WO | 2014113184 | A1 | 7/2014 |
| WO | 2014197061 | A2 | 12/2014 |

FORMING COOLING PASSAGES IN THERMAL BARRIER COATED, COMBUSTION TURBINE SUPERALLOY COMPONENTS

PRIORITY CLAIM

This application claims priority to International Application No. PCT/US16/18209, filed Feb. 17, 2016, and entitled "FORMING COOLING PASSAGES IN THERMAL BARRIER COATED, COMBUSTION TURBINE SUPERALLOY COMPONENTS" and further claims priority to International Application No. PCT/US15/16318, filed Feb. 18, 2015, and entitled "TURBINE COMPONENT THERMAL BARRIER COATING WITH CRACK ISOLATING ENGINEERED GROOVE FEATURES", the entire contents of which are incorporated by reference herein.

TECHNICAL FIELD

The invention relates to methods for inhibiting delamination of thermal barrier coatings ("TBC's") from superalloy substrates of combustion turbine components, such as engine blades, vanes, or transitions, during subsequent cooling passage formation. More particularly, the invention relates to formation of partially completed cooling passages in such superalloy components, which have skewed passage paths, prior to application of the TBC layer(s), and completion of the cooling passages after TBC application. The skewed path of the partially completed cooling passage establishes an overhanging shield layer of superalloy material that protects the TBC layer during completion of the cooling passage.

BACKGROUND

Known turbine engines, including gas/combustion turbine engines and steam turbine engines, incorporate shaft-mounted turbine blades circumferentially circumscribed by a turbine casing or housing. The remainder of this description focuses on applications within combustion or gas turbine technical application and environment, though exemplary embodiments described herein are applicable to steam turbine engines. In a gas/combustion turbine engine, hot combustion gasses flow in a combustion path that initiates within a combustor and are directed through a generally tubular transition into a turbine section. A forward or Row 1 vane directs the combustion gasses past successive alternating rows of turbine blades and vanes. Hot combustion gas striking the turbine blades cause blade rotation, thereby converting thermal energy within the hot gasses to mechanical work, which is available for powering rotating machinery, such as an electrical generator.

Engine internal components within the hot combustion gas path are exposed to combustion temperatures approximately well over 1000 degrees Celsius (1832 degrees Fahrenheit). The engine internal components within the combustion path, such as for example combustion section transitions, vanes and blades are often constructed of high temperature resistant superalloys. Blades, vanes, and transitions often include cooling passages terminating in cooling holes on component outer surface, for passage of coolant fluid into the combustion path.

Turbine engine internal components often incorporate a thermal barrier coat or coating ("TBC") of metal-ceramic material that is applied directly to the external surface of the component substrate surface or over an intermediate metallic bond coat ("BC") that was previously applied to the substrate surface. The TBC provides a thermal insulating layer over the component substrate, which reduces the substrate temperature. Combination of TBC application along with cooling passages in the component further lowers the substrate temperature.

Fabrication of cooling passages in, and application of TBC layers to superalloy components, creates conflicting manufacturing constraints. Traditionally, cooling passages are formed by removing superalloy material from the intended passage path within the component, with exemplary removal tools including mechanical cutting/drilling bits, or various ablation devices, such as high-pressure water jet, percussion laser pulsation, and electric discharge machining ("EDM"). Cut cooling passage path, profile and size are limited by the physical capabilities of the cutting instrument. For example, drilled passages are linear and have cross sectional symmetry to match the drill bit. Ablated passages are limited by the size of the ablation instrument and ability to maneuver the instrument along a cutting path.

Investment cast turbine engine components are fabricated by creating a hardened wax pattern, in a wax injection mold, which replicates the profile of the finished superalloy component. The wax pattern is enveloped in ceramic slurry, which is subsequently hardened by firing, into a ceramic shell casing. When wax is removed from the ceramic shell casing, the internal cavity is filled with molten superalloy material. Typically, more particularly, wax patterns for investment cast, superalloy components for combustion turbine engines, are injected into hard tool wax molds, and removed from the tools with precise and smooth surfaces. The wax patterns are then dipped in various ceramic slurry mixtures and processed to form the ceramic outer shell, which is subsequently sintered to form a vestibule in which molten metal is poured. Upon cooling and solidification, the outer ceramic shell is removed by mechanical and/or chemical methods and the metal part is then prepared for further processing. Further processing of the metal part includes ceramic core removal, finish machining, drilling of cooling holes, and application of a thermal barrier coating ("TBC"). Current state of the art processes often require the investment cast surface be lightly grit blasted to prepare the surface for bond coat application. At this point a bond coat, typically a metallic Cramoium, Aluminum, Yitria ("MCrAlY") coating is applied to the substrate via a spray deposition technique, such as High Velocity Oxy Fuel ("HVOF") or Low Pressure Plasma Spray ("LPPS"). After this a ceramic thermal barrier such as YSZ (Yttria Stabilized Zirconia) is applied to the surface of the MCrAlY via atmospheric or air plasma spray ("APS") to complete the coating system. In some cases, a two layer ceramic coating is applied via APS for low thermal conductivity.

The investment casting wax pattern does not have sufficient, reliable, structural integrity to form cooling passages directly therein. When cooling passages are formed in the mold that forms the wax pattern, there is more than insignificant chance that the cooling passage profile in the wax pattern will deform, or that the wax pattern passage will not fill completely with ceramic slurry; in either case the resultant passage in the metal casting does not confirm to design specification.

In some investment casting, component manufacturing processes, refractory metal core ("RMC") inserts that conform to the desired profiles and paths of cooling passages are placed in the molds prior to component metal casting. The RMC inserts have to be aligned precisely within the molds, and are removed after casting by chemical dissolution processes, adding to manufacturing complexity and expense. TBC layer application adds additional sequencing challenges to the manufacturing process.

If cooling passages are formed in the blade, vane, transition, or other superalloy component prior to application of the TBC layer, the passages will become obstructed by the TBC material as the latter is applied to the component surface. Obstruction can be mitigated by temporarily masking the cooling passages on the component surface prior to the TBC application, which adds additional, costly, steps to the manufacturing processes. In the alternative, excess TBC material obstructions within cooling passages can be removed subsequently by the aforementioned cutting processes. Post TBC-application cooling passage obstruction removal increases risk of TBC layer damage and/or delamination along the margins of cooling passages on the component surface. In some manufacturing processes, cooling passages are formed after application of a TBC layer to the component substrate. In one known post TBC-coating cooling passage formation process, a pulsed laser ablates TBC material from the component at the intended cooling passage entry point, and then ablates the superalloy material to form the passage.

As previously noted, there is risk of damage to the previously applied TBC layer, or delamination of the layer from the component substrate, as cooling passages are subsequently created within the component. Due to differences in thermal expansion, fracture toughness and elastic modulus, among other things, between typical metal-ceramic TBC materials and typical superalloy materials used to manufacture the aforementioned exemplary turbine components, there is potential risk of thermally- and/or mechanically-induced stress cracking of the TBC layer as well as TBC/turbine component adhesion loss at the interface of the dissimilar materials as the TBC layer and superalloy material are removed during cooling passage formation or cooling passage cleaning to remove TBC obstructions. The cracks and/or adhesion loss/delamination negatively affect the TBC layer's structural integrity and potentially lead to its spallation (i.e., separation of the TBC insulative material from the turbine component).

SUMMARY OF INVENTION

In exemplary embodiments of the methods described herein, delamination of thermal barrier coatings ("TBC's") from superalloy component substrates of components for combustion turbine engines, such as engine blades, vanes, or transitions, is inhibited during subsequent cooling passage formation. Partially completed cooling passages, which have skewed passage paths and which end in a terminus that is laterally offset from the passage entrance, are formed in the superalloy component prior to application of the TBC layer(s). The skewed path of each partially completed cooling passage establishes an overhanging shield layer of superalloy material that protects the TBC layer during completion of the cooling passage.

The invention embodiments described herein facilitate application of TBC layers, prior to completion of cooling passages, by initially forming a partially completed passage, with the shield layer interposed between the partial passage entrance and its laterally offset terminus, followed by subsequent TBC layer application. Excess TBC material obstructing the partial passage entrance is removed, in a manner that mitigates potential damage to surrounding TBC material on the margins of the partial passage entrance, exposing the partial passage terminus. Thereafter, in some embodiments, the superalloy material in the remainder of the cooling passage path is removed at a higher energy level, with the TBC material surrounding the margins of the partial passage entrance shielded by the overhanging layer of superalloy material. Thus, pre-formed cooling passages do not need to be masked prior to application of the TBC layer, as obstructing, remnant TBC material in the partially formed cooling passages is removable with less likelihood of damaging TBC material around the partial cooling passage entrance margins.

Exemplary embodiments of the invention feature a method for forming a cooling passage in a thermal barrier coated, superalloy component for a combustion turbine engine, with the passage having a passage path, including an inlet and an outlet. A partially completed cooling passage is formed in a surface of a superalloy component for a combustion turbine engine, the partially formed passage having an entrance formed in the component surface, corresponding to a cooling passage inlet or outlet, and a skewed passage path within the component having a laterally offset terminus distal the component surface. The partially completed, cooling passage has an overhanging shield layer of superalloy material interposed between the laterally offset passage terminus and the component surface proximate the passage entrance. A thermal barrier coating is applied over the component surface and the partially formed passage entrance. An ablation apparatus is used for ablating thermal barrier coating and superalloy material to form the completed cooling passage, by aligning the ablation device proximate the entrance of the partially formed passage, and then ablating thermal barrier coating material from the partially formed passage, reaching the passage terminus. The cooling passage is completed by ablating superalloy material out of the skewed path, partially formed passage, along a cooling passage path from the terminus to the other of the cooling passage inlet or outlet. The overhanging shield layer of superalloy material inhibits damage to thermal barrier coating material proximate the passage entrance caused by ejection of ablated superalloy material out of the passage entrance.

Other exemplary embodiments of the invention feature a method for forming a cooling passage in an investment cast, superalloy blade or vane component for a combustion turbine engine with the component having a component wall delimited by respective first and second wall surfaces, and the cooling passage extending through the component wall between its respective first and second surfaces. A partially completed cooling passage is formed in a first surface of a wall of a superalloy blade or vane component for a combustion turbine engine. The partially completed passage has an entrance formed in the component first surface, corresponding to a cooling passage inlet or outlet, and a skewed passage path within the component wall, having a terminus laterally offset from and distal the component first surface, and an overhanging shield layer of superalloy material in the wall that is interposed between the laterally offset passage terminus and the component first surface proximate the passage entrance. A thermal barrier coating is applied over the component first surface and the partially formed passage entrance. An ablation apparatus is used for ablating thermal barrier coating and superalloy material, by aligning the ablation device proximate the entrance of the partially formed passage and ablating thermal barrier coating material from the partially formed passage, reaching the passage terminus. The cooling passage is completed by ablating superalloy material out of the skewed path, partially formed passage, along a cooling passage path from the terminus to the other of the cooling passage inlet or outlet in a second surface of the component wall. During ablation, the overhanging shield layer of superalloy material inhibits damage to thermal barrier coating material proximate the passage entrance, which is caused by ejection of ablated superalloy material out of the passage entrance.

The respective features of the exemplary embodiments of the invention that are described herein may be applied jointly or severally in any combination or sub-combination.

BRIEF DESCRIPTION OF DRAWINGS

The exemplary embodiments of the invention are further described in the following detailed description in conjunction with the accompanying drawings, in which.

To facilitate understanding, identical reference numerals have been used, where possible, to designate identical elements that are common to the figures. The figures are not drawn to scale.

DESCRIPTION OF EMBODIMENTS

When practicing exemplary method embodiments of the invention, delamination of thermal barrier coatings ("TBC's") from superalloy substrates of components for combustion turbine engines is inhibited during subsequent cooling passage formation. One or more partially completed cooling passages are formed in the superalloy component, which respectively have skewed passage paths from an entrance at the component surface onto which will be applied and a terminus within the component that is laterally offset from the passage entrance. The skewed path of each partially completed cooling passage establishes an overhanging shield layer of superalloy material that protects the TBC layer during completion of the cooling passage. TBC layers are applied prior to cooling passage completion, which in some embodiments eliminates the need to mask preformed portions of cooling passages. Excess TBC material obstructing the partial passage entrance is removed, in a manner that mitigates potential damage to surrounding TBC material on the margins of the partial passage entrance, exposing the partial passage terminus. Thereafter, in some embodiments, the superalloy material in the remainder of the cooling passage path is removed at a higher energy level, expelling superalloy remnants out of the removal site into the previously formed, partially completed passage and ultimately out of the component's partially completed passage entrance. The overhanging layer of superalloy material in the partially completed passage shields TBC material surrounding the margins of the partial passage entrance from damage by expelled superalloy remnants as the remainder of the cooling passage is being formed in the component.

Figure 1:
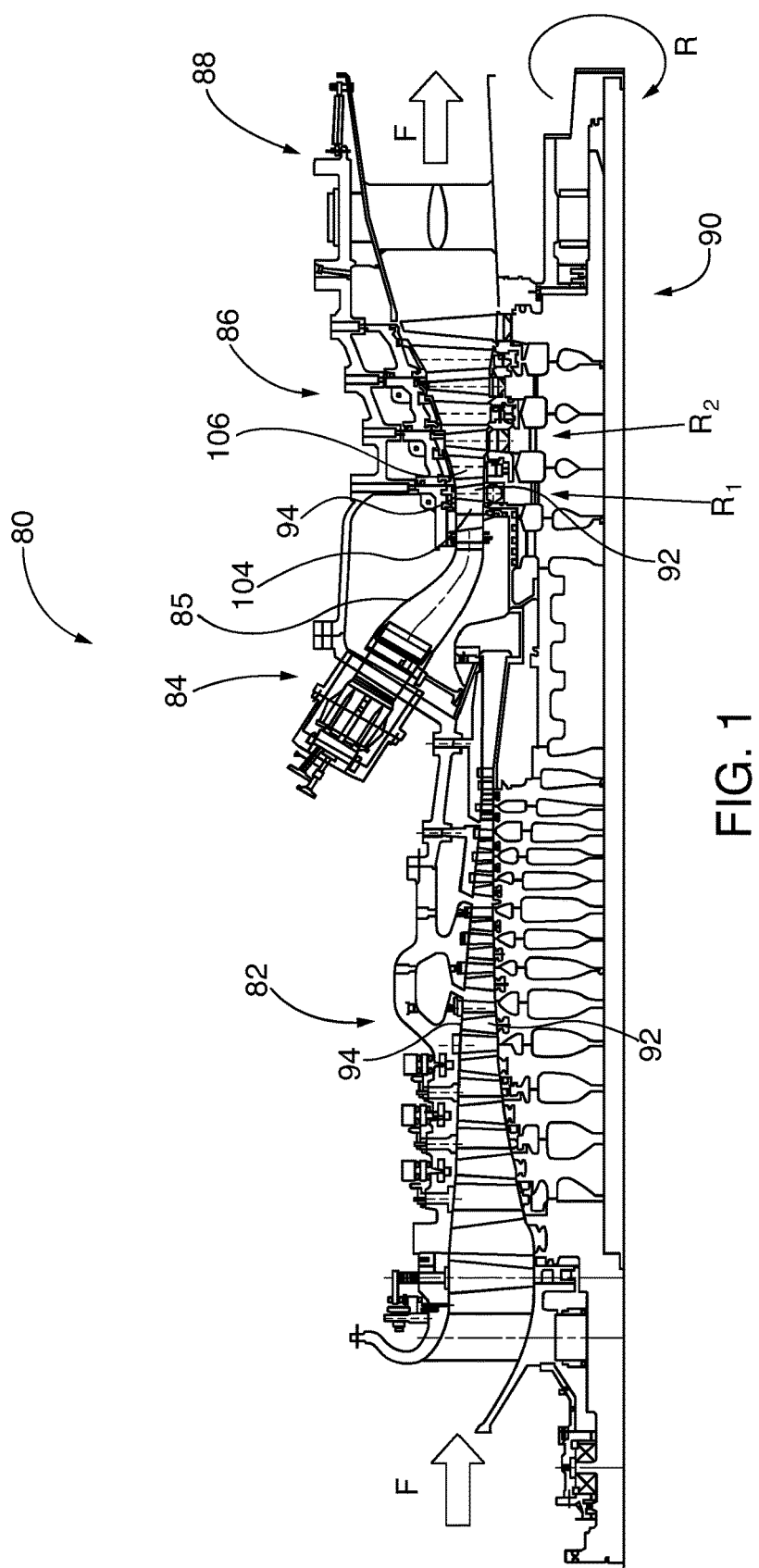
FIG. 1 is a partial axial cross sectional view of a gas or combustion turbine engine incorporating one or more superalloy components, having cooling passages formed in accordance with exemplary method embodiments of the invention.
Figure 2:
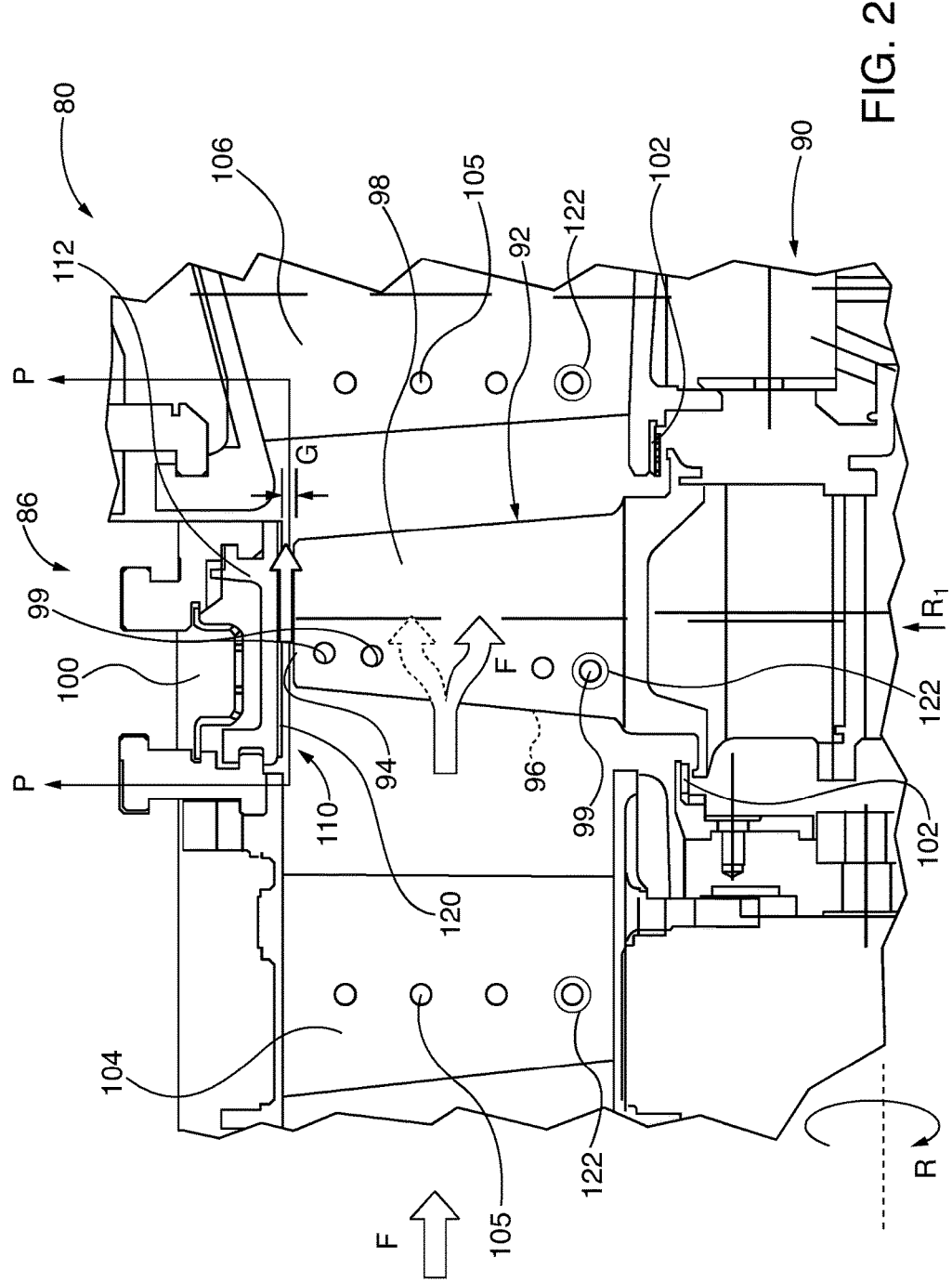
FIG. 2 is a detailed cross sectional elevational view of the turbine engine of FIG. 1, showing Rows 1 turbine blade and Rows 1 and 2 vanes, having cooling passages formed in accordance with exemplary method embodiments of the invention.
Figure 3:
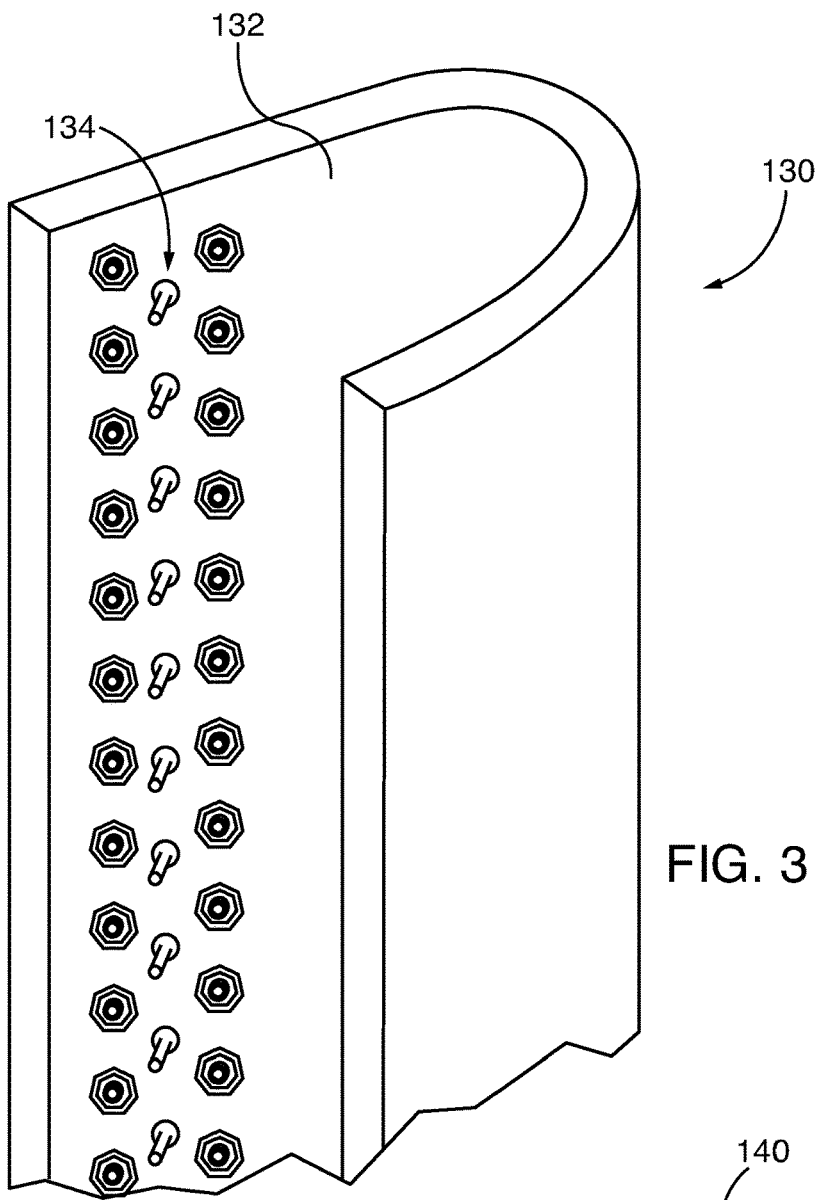
FIG. 3 is an elevational perspective view of an exemplary ceramic shell insert, having ceramic posts and engineered surface features ("ESFs"), which is used to form cooling passages in superalloy components, in accordance with exemplary method embodiments of the invention.
Figure 4:
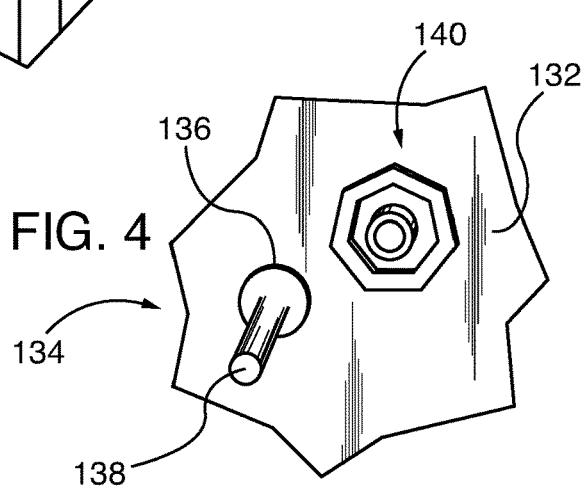
FIG. 4 is a perspective view of exemplary ceramic posts and ESFs of the ceramic shell insert of FIG. 3.

Referring to FIGS. 1-2, turbine engines, such as the gas or combustion turbine engine 80 include a multi-stage compressor section 82, a combustion section 84, a multi-stage turbine section 86 and an exhaust system 88. Atmospheric pressure intake air is drawn into the compressor section 82 generally in the direction of the flow arrows F along the axial length of the turbine engine 80. The intake air is progressively pressurized in the compressor section 82 by rows of rotating compressor blades and directed by mating compressor vanes to the combustion section 84, where it is mixed with fuel and ignited. The ignited fuel/air mixture, now under greater pressure and velocity than the original intake air, is directed through a transition 85 to the sequential blade rows $R_1$, $R_2$, etc., in the turbine section 86. The engine's rotor and shaft 90 has a plurality of rows of airfoil cross sectional shaped turbine blades 92 terminating in distal blade tips 94 in the compressor 82 and turbine 86 sections.

For convenience and brevity, further discussion of cooling passage formation and application of thermal barrier coat ("TBC") layers on the combustion turbine engine components will focus on the turbine section 86 embodiments and applications, though similar constructions are applicable for the compressor 82 or combustion 84 sections, as well as for steam turbine engine components. In the engine's 80 turbine section 86, each turbine blade 92 has a concave profile high-pressure side 96 and a convex low-pressure side 98. Cooling passages 99 that are formed in the blade 92 facilitate passage of cooling fluid along the blade surface. The high velocity and pressure combustion gas, flowing in the combustion flow direction F imparts rotational motion on the blades 92, spinning the rotor 90. As is well known, some of the mechanical power imparted on the rotor shaft 90 is available for performing useful work. The combustion gasses are constrained radially distal the rotor 90 by turbine casing 100 and proximal the rotor 90 by air seals 102 comprising abradable surfaces.

Referring to the Row 1 section shown in FIG. 2, respective upstream vanes 104 and downstream vanes 106 respectively direct upstream combustion gas generally parallel to the incident angle of the leading edge of turbine blade 92 and redirect downstream combustion gas exiting the trailing edge of the blade 92 for a desired entry angle into downstream Row 2 turbine blades (not shown). Cooling passages 105 that are formed in the vanes 104, 106 facilitate passage of cooling fluid along the vane surface. It is noted that the cooling passages 99 and 105 shown in FIG. 2 are merely schematic representations, are enlarged for visual clarity, and are not drawn to scale. A typical turbine blade 92 or vane 104, 106 has many more cooling passages distributed about the respective airfoil bodies of much smaller diameter relative to the respective blade or vane total surface area that is exposed to the engine combustion gas.

As previously noted, turbine component surfaces that are exposed to combustion gasses are often constructed with a TBC layer for insulation of their underlying substrates. Typical TBC coated surfaces include the turbine blades 92, the vanes 104 and 106, ring segments 110, abradable surfaces 120 and related carrier surfaces of turbine vanes, and combustion section transitions 85. The TBC layer for blade 92, vanes 104 and 106, ring segments 110, and transition 85 exposed surfaces are often applied by thermal sprayed or vapor deposition or solution/suspension plasma spray methods, with a total TBC layer thickness of 300-2000 microns ($\mu$m).

Figure 5:
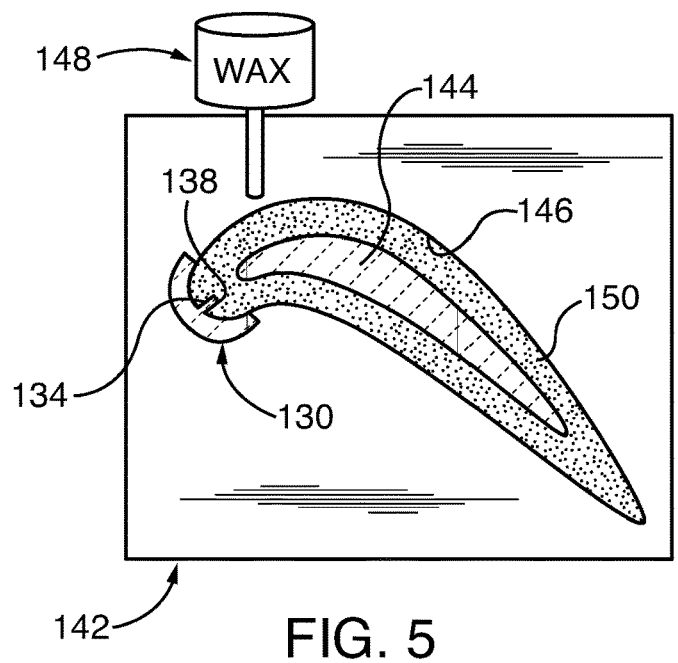
FIG. 5 is a cross-sectional plan view of a wax injection mold for a turbine blade airfoil, incorporating the ceramic shell insert of FIG. 3 and a ceramic core, during wax injection into the mold cavity, which is used to form cooling passages in superalloy components, in accordance with exemplary method embodiments of the invention.

Fabrication of Partially Completed Cooling Passages with Ceramic Shell Inserts in Investment Cast, Engine Components Referring to FIGS. 3-7, in some embodiments of this invention, a ceramic insert 130 incorporates the profile of partially completed cooling passages, and optionally other types of engineered surface features ("ESFs") 140. ESFs are described in the aforementioned International Application No. PCT/US15/16318. The ceramic shell insert 130 is typically a partially sintered ceramic (similar to typical core material for investment casting processes) that is placed or positioned onto the wax pattern 150. Alternatively, as shown in FIG. 5, the ceramic shell insert 130 is placed into the wax injection tool or mold 142 and incorporated in the wax pattern 150 when it is injected and subsequently hardened. The wax pattern 150, (incorporating the ceramic insert 130 and a ceramic core 144) is dipped in and coated with ceramic slurry. The slurry is hardened, to form an investment casting outer shell mold 152. The inner or interface surface 132 of the ceramic shell insert 130 (which is attached to the wax pattern 150 surface) incorporates the casting mold surface details for the eventual metal surfaces and structurally cast-in-place, cooling passage features.

The cooling passage features are defined in the ceramic shell insert 130 by the projecting ceramic posts 134 that conform to the corresponding, partial cooling passage profiles. This casting method retains detail in the surface profile features, including the cooling passage profiles, which would otherwise be compromised in a wax pattern 150 due to fragility of the wax material composition. The ceramic shell insert 130 surface profile creation process for the superalloy component lends itself to modularity, where additional partially completed cooling passage forming ceramic posts 134, and engineered surface feature anchoring surfaces 140 are incorporated for exposed airfoil areas such as leading edges and trailing edges of turbine blades 92 or vanes 104, 106. In order to be compatible with ceramic outer casting shell 152 shrinkage, in some embodiments the ceramic shell inserts 130 are partially thermally processed prior to application to the wax injection tool 142. In the example of an engine vane 104, 106 or blade 92 of FIG. 2, when the casting shell 152 is thermally treated, the shell insert 130 remains as part of the outer ceramic shell structure 152, which defines the outer cavity wall for the investment cast surfaces e.g., the turbine blade 92, concave profile, high-pressure side 96 and the convex low-pressure side 98 surfaces.

The ceramic shell insert system 130 exemplary embodiments of FIGS. 3-8 provide the ability to cast one or an array of engineered surface features and/or partial cooling hole passages 99, 105 in a blade 92 or vane 104, 106 within the engine 80 of FIG. 2, through ESFs 140 and ceramic posts 134, that are within the ceramic insert interface or inner surface 132. A partial cooling passage is manufactured by creating a ceramic insert 130 with the ceramic rod protrusions or posts 134. The ceramic rods 134 of FIGS. 4 and 8 have a rim portion 136 that is formed to match the corresponding, intended inlet or outlet hole profile of a cooling passage within a combustion turbine component, and a post tip portion 138 whose surface profile and distal end define the corresponding surface profile of the terminus or end of the partially complete cooling passage. The ceramic posts 134 are integrally formed within, or formed separately and bonded to the inner surface 132 of the ceramic shell insert 130. The ceramic posts or rods 134 penetrate, or in other words embed, within the wax pattern 150, creating a partially complete cooling hole 99 or 105. The ceramic shell insert 130 is not integral with an internal ceramic core 144, and in exemplary embodiment herein, the projecting ceramic posts 134 do not contact the internal core, 144, leaving an incomplete cooling passage. However, a partial cooling passage/hole beneficially reduces processing time needed to cut a complete cooling passage within a solid superalloy component after casting. As will be described in detail herein, casting superalloy, combustion turbine components, with partially completed or formed cooling passages 99 and 105, advantageously simplifies cooling passage completion, and reduces likelihood of previously applied thermal barrier coat delamination, during cooling passage completion.

The main steps for investment casting of a combustion turbine component with partially completed cooling passages, in accordance with embodiments of the invention methods, are shown in FIGS. 5-12. Each step is described generally as follows.

Figure 8:
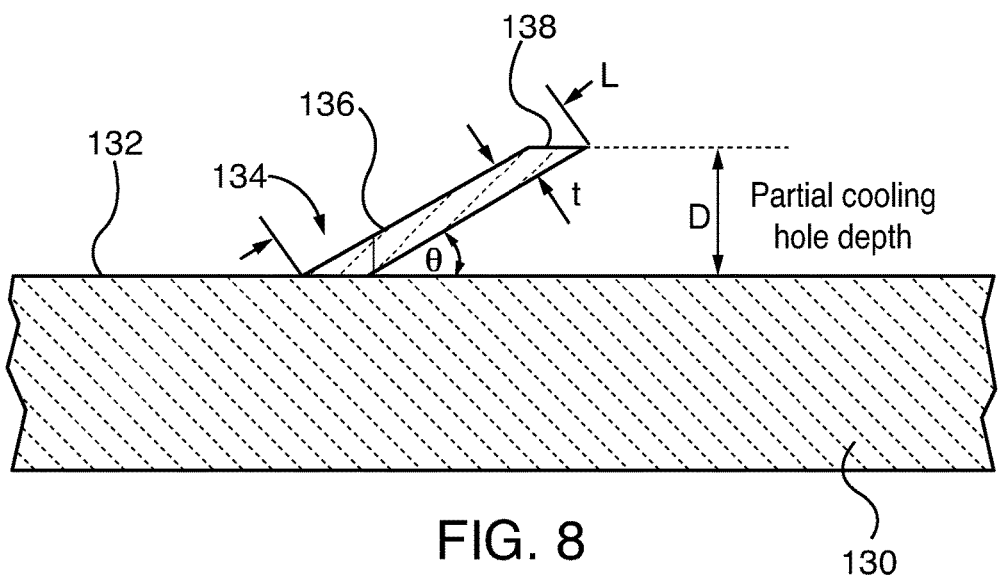
FIG. 8 is a cross-sectional view of a ceramic shell insert and ceramic post, which is used to form cooling passages in superalloy components, in accordance with exemplary method embodiments of the invention.

Referring to FIGS. 5 and 8, one or more shell inserts 130 are provided to match desired surface profile of the engine component cooling passage profiles or engineered surface features. The completed ceramic shell insert 130 is oriented within a solid wax pattern 150. In some embodiments, the ceramic shell insert 130 is pushed directly into a previously completed, hardened wax pattern 150 that mimics the rest of the component profile. In other embodiments, due to potential fragility of the ceramic posts 134, the ceramic insert 130 is positioned within an internal cavity 146 of a wax injection mold or die 142, along with any other desired inserts, such as the ceramic core 144, in a spaced relationship from other mold surfaces. The ceramic core corresponds to internal hollow portion surface profile of the engine component, such as a blade or vane cooling plenum. In some embodiments, multiple, modular ceramic shell inserts 130 are used to form the entire desired surface of the component casting. Molten wax 148 is interposed or injected into the mold or die cavity 146, which envelops therein the posts 134 of the ceramic shell insert, and any other types of engineered surface features. Gaps between the ceramic posts 134 and other mold surface features, such as a ceramic core 144, are now filled with molten wax 148, which subsequently hardens into a wax pattern 150.

Figure 6:
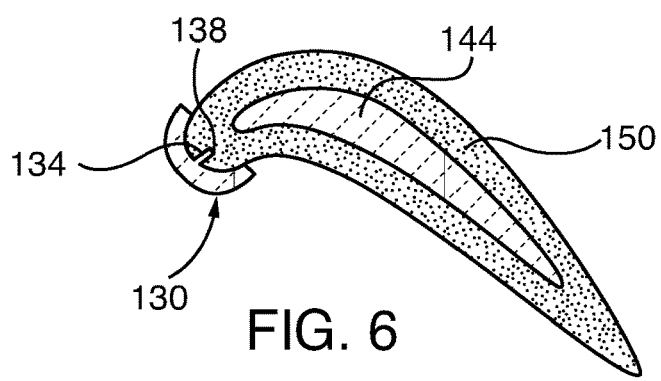
FIG. 6 is a cross-sectional plan view of a hardened wax pattern, with embedded ceramic shell insert and ceramic core, for a turbine blade airfoil, after removal from the wax injection mold of FIG. 5, which is used to form cooling passages in superalloy components, in accordance with exemplary method embodiments of the invention.
Figure 9:
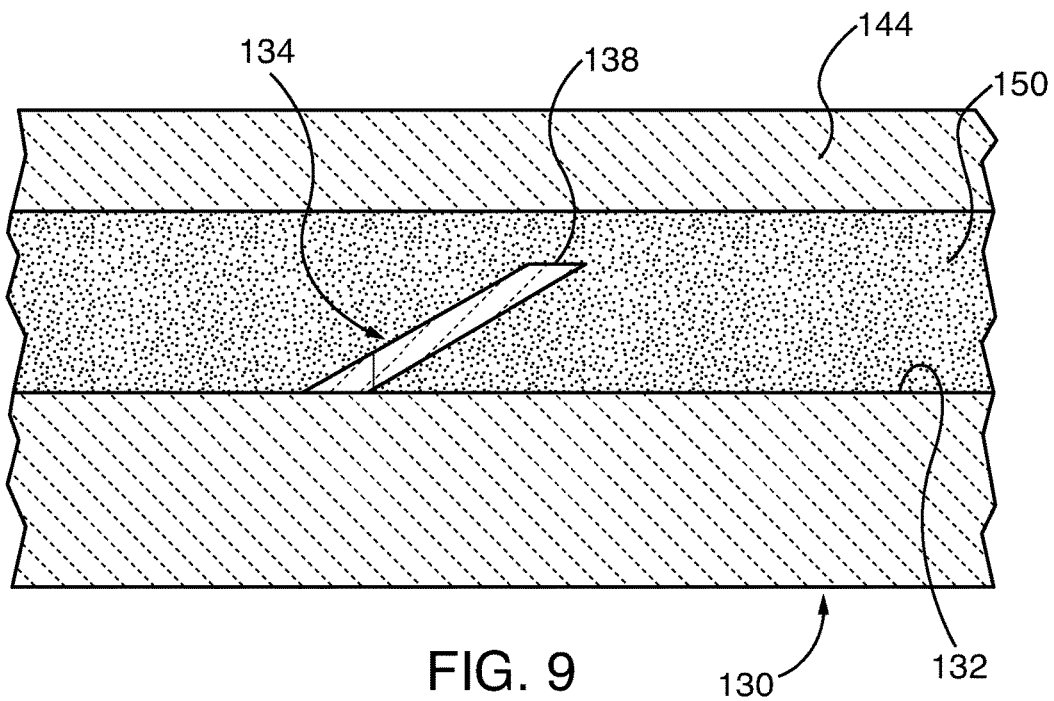
FIG. 9 is a cross-sectional view of the ceramic shell insert and ceramic post of FIG. 8, in opposed orientation with the ceramic core, after wax injection, in accordance with exemplary method embodiments of the invention.

The hardened wax pattern 150, which now captures the ceramic shell insert 130, the posts 134 and the ceramic inner core 144, is separated from the mold 142, leaving the composite pattern of FIGS. 6 and 9, which conforms to the outer profile of the desired engine component. The composite component pattern, including hardened wax pattern 150, the shell insert 130 and ceramic core 144 are dipped or otherwise enveloped in ceramic slurry, dried, and fired in known types of investment casting manufacturing processes, to form a ceramic outer shell or casting vessel 152, forming a casting mold for the superalloy component. The ceramic/wax composite vessel 152 and pattern 150 is dewaxed, such as in a known autoclave, leaving a composite ceramic vessel, with the hollow cavity 146, shown in FIGS. 7 and 10.

The composite ceramic vessel 152 hollow cavity 146 incorporates the surface features of the superalloy component, including the partial cooling passages/holes. In the embodiment of both of FIGS. 7 and 10, the post 134 does not contact the ceramic inner core 144, leaving an open-space gap G that will be filled with superalloy material during the subsequent casting process. The total substrate wall thickness G of the cast component is established by the distance between the inner surface of the ceramic core 144 and the inner surface 132, of the ceramic shell insert 130, within the mold cavity 146. In FIG. 11, the ceramic vessel 152, including the ceramic shell insert 130 and the ceramic core 144, is filled with molten superalloy metal 154, typically in a vacuum casting process. Ultimately the post 134, including the post rim portion 136 and post tip 138, will form the profile of a partially completed cooling passage having a partial cooling passage depth D, which as previously described is approximately 50% to 90% of the substrate wall thickness G. The remaining depth remnant of superalloy material 154 to remove from the component, in order to complete the cooling passage to the outer boundary of the component is G minus D.

Figure 7:
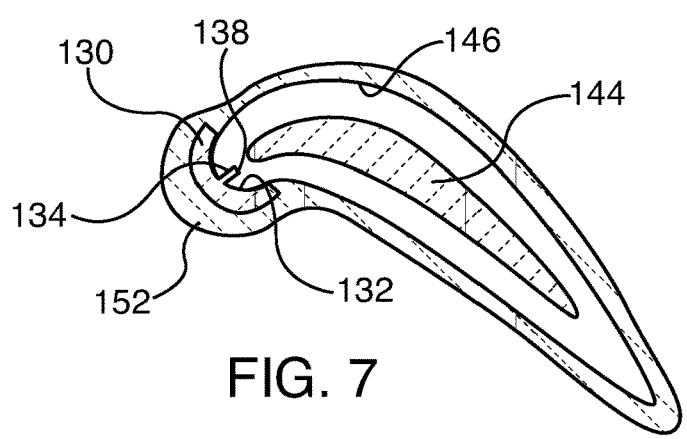
FIG. 7 is a cross-sectional plan view of the ceramic shell insert and ceramic core after envelopment in an outer ceramic shell and removal of the hardened wax, which is used to form cooling passages in superalloy components, in accordance with exemplary method embodiments of the invention.

In FIG. 11, casting of the superalloy material 154 in the outer ceramic shell-casting mold 152 is completed, trapping the post 134, including the rim 136 and post tip portion 138 in the now hardened metal. Once the superalloy metal 154 has solidified and cooled, ceramic mold material forming the former shell insert 130 and posts 134, ceramic core 144, and the outer ceramic shell 152 of FIG. 7, is removed from the hardened metal casting 154 mechanically and chemically. Typical, known chemical removal processes for ceramic mold material use heated sodium hydroxide (NaOH), and/or potassium hydroxide (KOH) baths.

The now ceramic-free metal casting 154 now has a partially completed cooling passage 156 of partial depth D compared to the total substrate thickness G. The partially completed cooling passage 156 includes an entrance 158 and a terminus or hole bottom 160, shown in FIG. 12. In this embodiment, the terminus 160 is laterally offset from the passage entrance 160. The partially completed cooling passage 156 is shown schematically as a cylindrical passage, oriented at an angle θ relative to the component surface 161. The partially completed cooling passages in the now ceramic-free superalloy metal casting are completed, before or after optional TBC application, by removing remnant metal from the casting by mechanical cutting, pressurized water or other fluid jet, or ablation processes. In some embodiments, remnant metal removal to complete the cooling passage is initiated inside the partial cooling passage 156, starting at the terminus 160. Alternatively, remnant metal is removal is initiated from outside the substrate (here opposite the partially completed cooling passage entrance 158) until the newly created passage portion is in communication with the terminus of the partially completed cooling passage 156.

Figure 10:
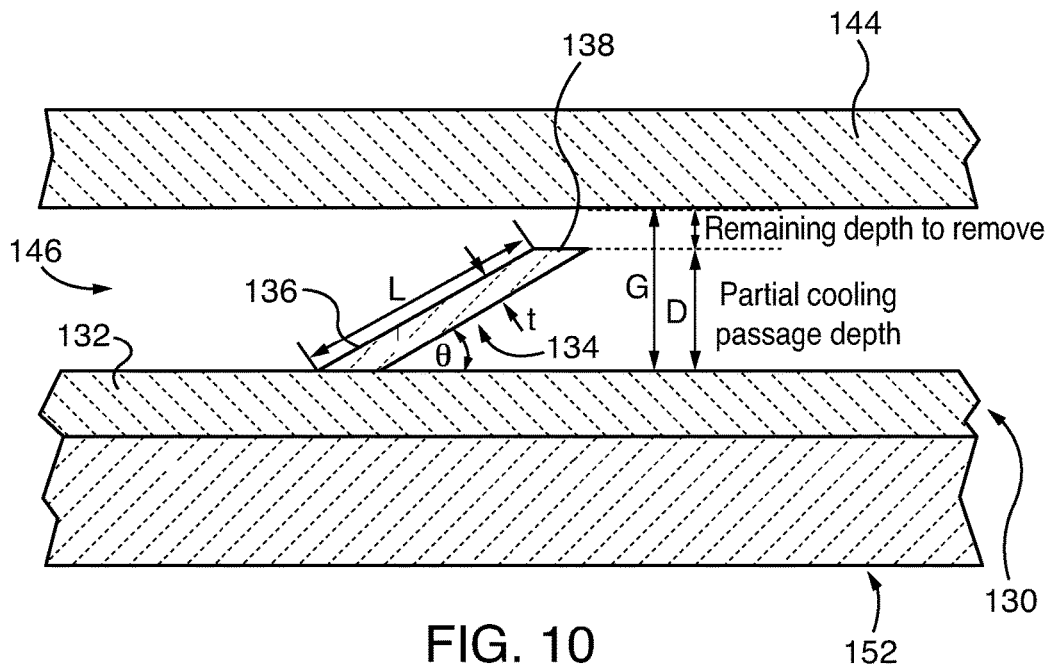
FIG. 10 is a cross-sectional view of the ceramic shell insert and ceramic post of FIG. 8, in opposed orientation with the ceramic core, after envelopment in an outer ceramic shell and removal of the hardened wax, in accordance with exemplary method embodiments of the invention.
Figure 11:
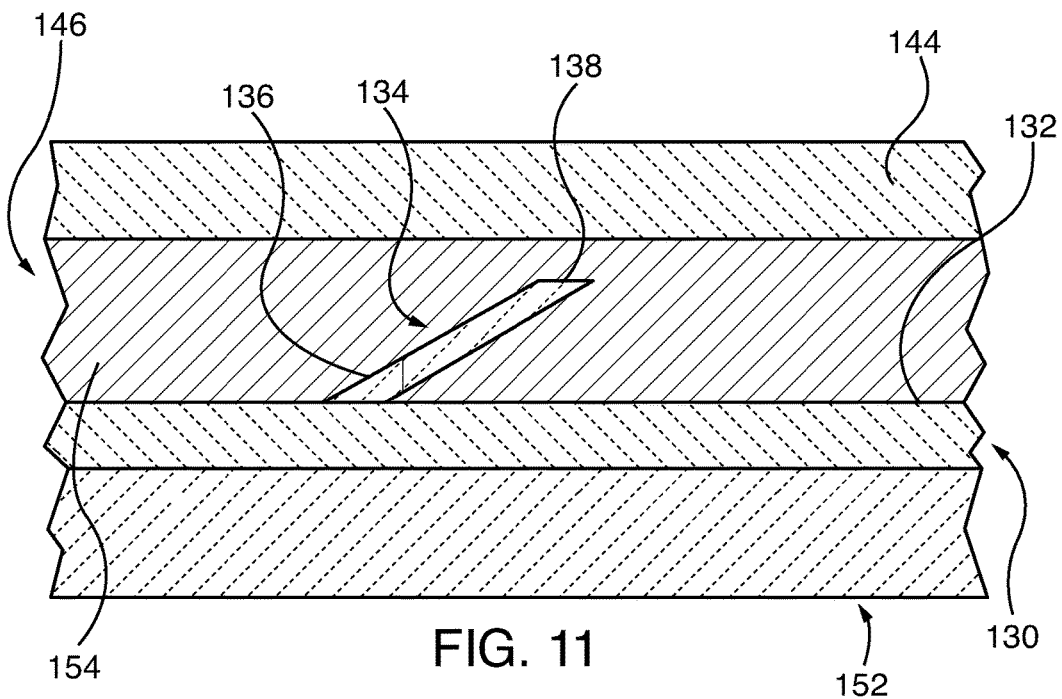
FIG. 11 is a cross-sectional view of the ceramic shell insert and ceramic post of FIG. 8, in opposed orientation with the ceramic core, after filling the mold with molten superalloy material and subsequent hardening of the material, in accordance with exemplary method embodiments of the invention.
Figure 12:
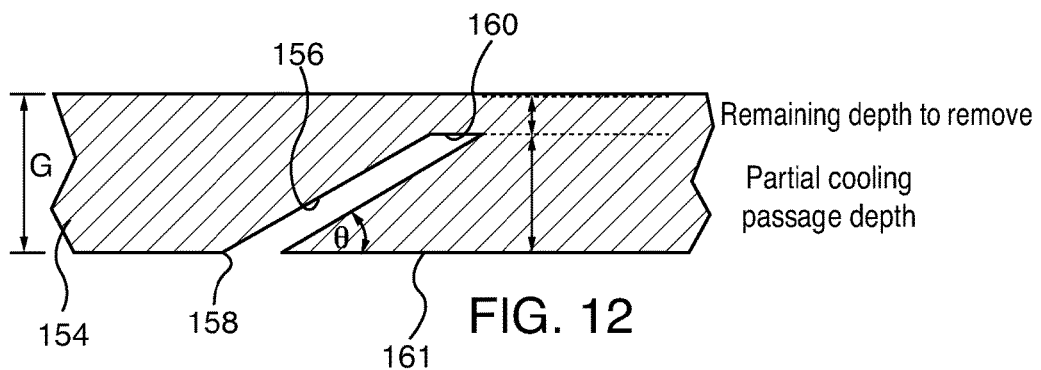
FIG. 12 is a cross-sectional elevation view of the superalloy component casting, after removal of the ceramic shell insert, ceramic core and ceramic outer shell, and a formed, partial depth cooling passage formed therein, in accordance with exemplary method embodiments of the invention.

Referring to FIGS. 8, 10 and 12, post 134 dimension definitions are summarized as follows. In some embodiments, the posts 134 are oriented at an angle θ of less than 90 degrees and typically 30 to 60 degrees relative to the ceramic shell insert surface 132. The posts 134 have a diameter or thickness "t", which is chosen to match the cross sectional diameter of a corresponding cooling passage. In embodiments herein, the post diameter t is typically 0.7 mm to 1.75 mm and the post 134 length "L" is typically the cooling passage partial depth D multiplied by the cosine θ. In some embodiments, the cooling passage partial depth D is 50% to 95% of the total substrate thickness "G".

As previously described, the ceramic shell insert 130 is manufactured with an array of ceramic posts that are profiled to mimic integrally cast, partial cooling passages, or holes. Typically, known, cut cooling holes, not formed by the methods of this invention, are 0.5-0.6 mm diameter, cylindrical in shape, and at 30-degree angle θ to the surface. As shown in FIG. 12, this type of passage or hole 156 can be integrally created in the casting, rather than fully cut in solid metal after the casting process, by using the ceramic post structure 134 in the ceramic shell insert 130. However, geometry of the ceramic post 134 is not limited to simple shapes and angles. Various exemplary partial cooling passage profiles are shown in FIGS. 13-22, which will be described in greater detail herein. In one or more embodiments, the ceramic shell insert 130 has a plurality of ceramic posts 134, corresponding to a pattern of partially completed or partial-depth cooling passages in the engine component. In some embodiments, a plurality of ceramic shell inserts 130 are used to form partial cooling passages within a component. In one or more embodiments, at least one ceramic post 134 projects from the ceramic insert surface 132 at an angle θ, which is less than 90 degrees, and in other embodiments at least one ceramic post 134 projects from the ceramic insert surface 132 at an angle θ of between 30 and 60 degrees.

As previously noted, integrally cast, partial cooling passages, formed by the method embodiments of the present invention, allow cooling fluid flow, heat transfer, and TBC delamination inhibiting design options that cannot be easily replicated by known post-casting cooling passage formation processes, with easier manufacture than passages formed by known refractory metal core ("RMC") insert processes. Cooling passage/hole configurations are not limited to simple cylindrical holes, as shown in FIG. 12. Changing the diameter or cross section or passage path of the cooling passage profile through the thickness of the component wall beneficially offers ability to increase or decrease the velocity of the cooling flow, depending on whether the hole diameter/cross section is decreased or increased as it approaches the outer surface of the component.

Figure 13:
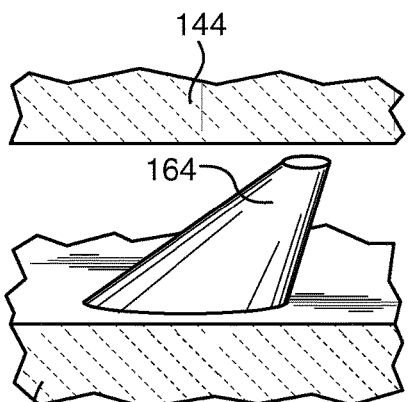
FIG. 13 is a cross-sectional view of a ceramic shell insert and alternative embodiment converging frustro-conical profile ceramic post, in opposed orientation with a ceramic core, similar to FIG. 8, which is used to form cooling passages in superalloy components, in accordance with exemplary method embodiments of the invention.
Figure 14:
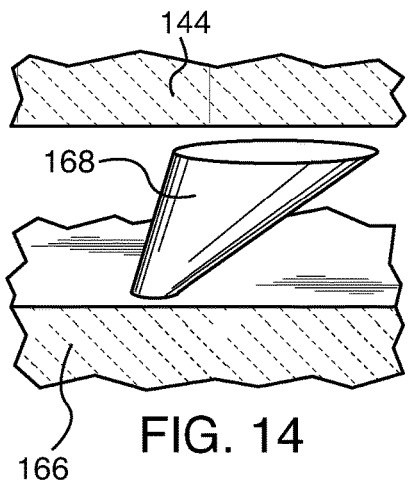
FIG. 14 is a cross-sectional view of a ceramic shell insert and alternative embodiment diverging profile ceramic post, in opposed orientation with a ceramic core, similar to FIG. 8, which is used to form cooling passages in superalloy components, in accordance with exemplary method embodiments of the invention.
Figure 15:
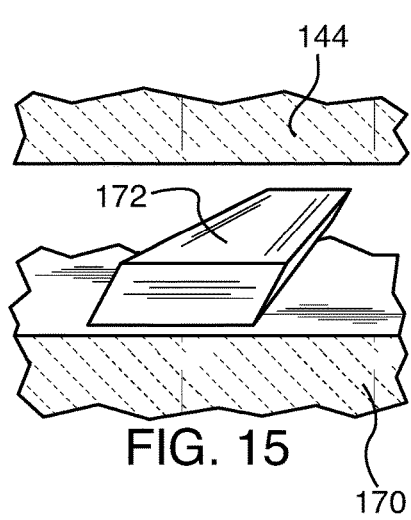
FIG. 15 is a cross-sectional view of a ceramic shell insert and alternative embodiment profile rectangular profile ceramic post, in opposed orientation with a ceramic core, similar to FIG. 8, which is used to form cooling passages in superalloy components, in accordance with exemplary method embodiments of the invention.
Figure 16:
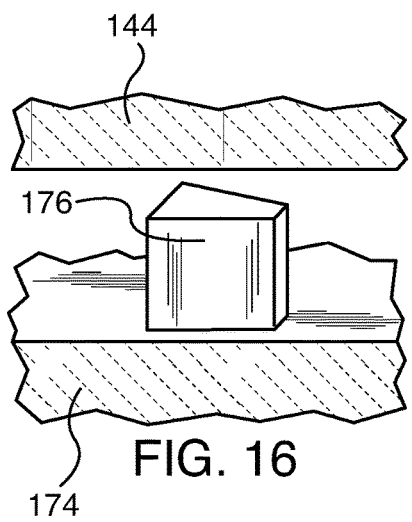
FIG. 16 is a cross-sectional view of a ceramic shell insert and alternative embodiment trapezoidal profile ceramic post, in opposed orientation with a ceramic core, similar to FIG. 8, which is used to form cooling passages in superalloy components, in accordance with exemplary method embodiments of the invention.
Figure 17:
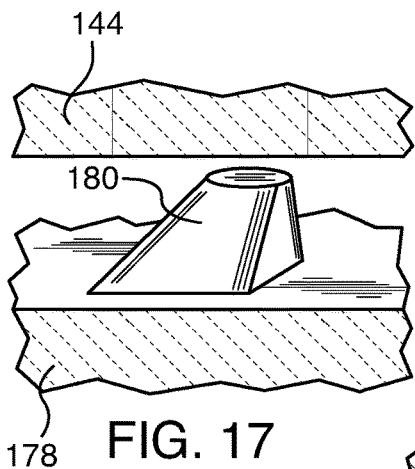
FIGS. 17 and 18 are cross-sectional views of ceramic shell inserts and alternative embodiment trapezoidal profile ceramic posts in opposed orientation with ceramic cores, similar to FIG. 8, which are used to form film cooling passages in superalloy components, in accordance with exemplary method embodiments of the invention.
Figure 18:
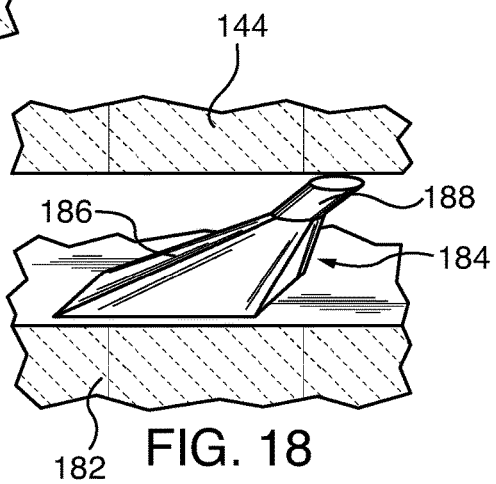

FIGS. 13-22 show alternative cooling passage profiles that are formed in investment cast, superalloy components. In all of FIGS. 13-22, the ceramic inner core 144 forms an internal surface of an engine component, such as a turbine blade or vane. FIGS. 13-18 show exemplary embodiments of change of cooling passage shape made by the casting methods of the present invention. By way of background, changes in cooling passage shape have been previously made by EDM and laser ablation, as well as by other known material cutting methods. For example, film-cooling passages on turbine blades and vanes have been previously made by EDM or millisecond laser drilling, and then a trapezoidal/pyramidal shape, flared outer surface profile is created on the surface by use of a finer nanosecond laser. In FIG. 13, the ceramic post 164 has a diverging cylindrical profile toward the ceramic insert 162, which will form a corresponding, divergent cooling passage profile in a turbine engine component outer surface. Conversely, in FIG. 14, the ceramic post 168 has a converging cylindrical profile toward the ceramic insert 166. In FIG. 15, the ceramic post 172 that is formed in ceramic insert 170 has a rectangular profile, whereas in FIG. 16, the ceramic post 176 of the ceramic insert 174 has a trapezoidal profile. In FIG. 17, a projecting, trapezoidal profile post 180 in the ceramic insert 178 has a smooth, angular profile transition to the post tip 181, which corresponds to the terminus, or inner-most reaching portion or pinnacle of the partially completed cooling passage, whereas the post 184 on the ceramic insert 182 of FIG. 18 has a stepped transition from a trapezoidal entrance portion 186 to a necked, cylindrical portion 188 at the post tip or terminus.

Figure 19:
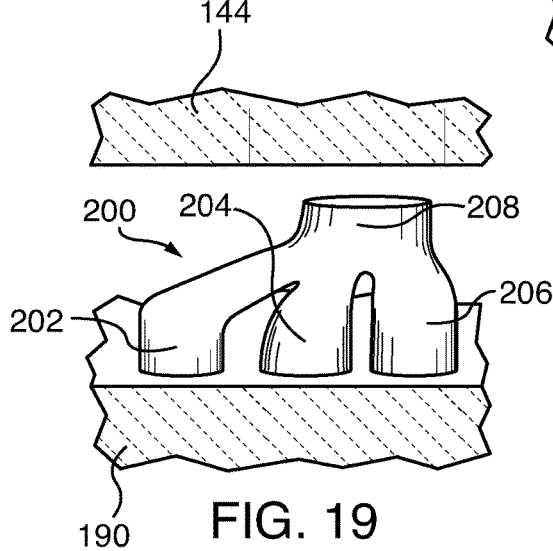
FIGS. 19 and 20 are cross-sectional views of ceramic shell inserts and alternative embodiment split-profile ceramic posts in opposed orientation with ceramic cores, similar to FIG. 8, which are used to form split cooling passages in superalloy components, in accordance with exemplary method embodiments of the invention.
Figure 20:
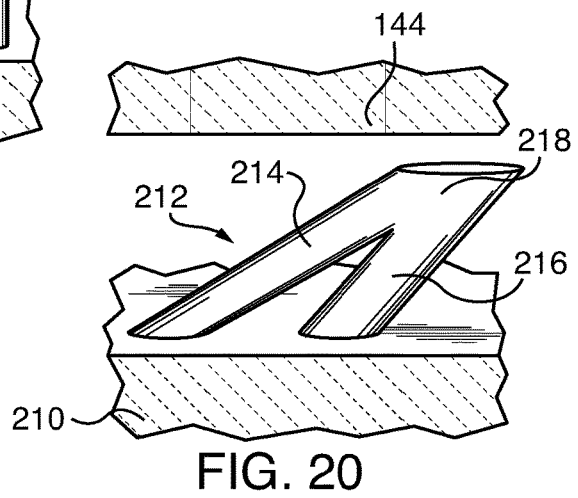
Figure 21:
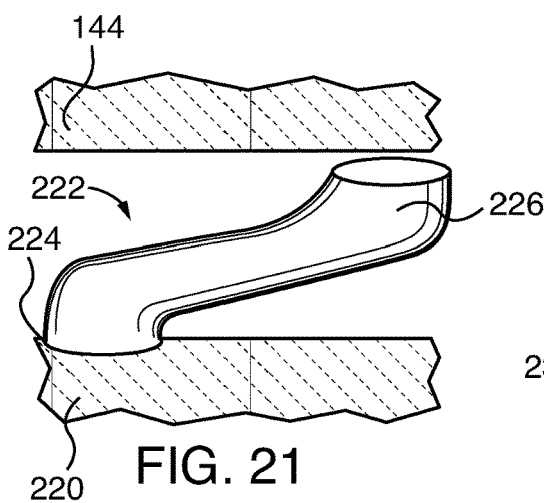
FIGS. 21 and 22 are cross-sectional views of ceramic shell inserts and alternative embodiment non-linear, asymmetrical profile ceramic posts in opposed orientation with ceramic cores, similar to FIG. 8, which are used to non-linear and/or asymmetrical cooling passages in superalloy components, in accordance with exemplary method embodiments of the invention.
Figure 22:
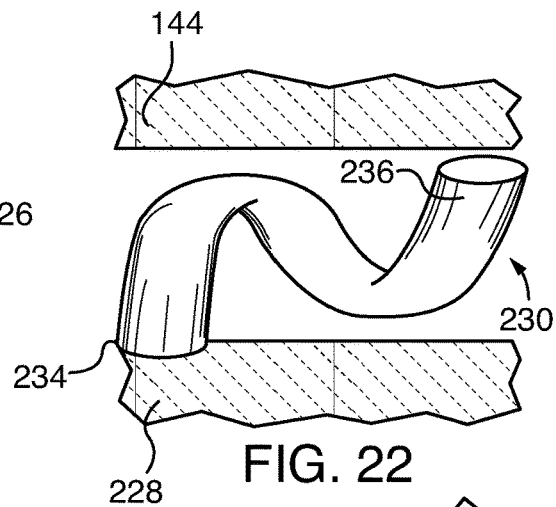

Additional embodiments for forming posts in ceramic inserts are shown in FIGS. 19 and 20, where one cooling fluid feed from an exemplary blade or vane component-cooling cavity is split into many cooling ejections on the surface. In FIG. 19, the projecting post 200 of the ceramic insert 190 creates a cooling passage with a single feed plenum at the terminus 208 that splits into three cooling path outlets 202, 204, 206, which will exhaust from the component surface. A cooling passage with more or less than three splits can be constructed in accordance with embodiments of the present invention. An alternative embodiment is shown in FIG. 20, where the projecting post 212, formed on the ceramic insert 210, forms one passage at the terminus 218 that splits linearly into two passages/holes outlets 214 and 216. Such multi-dimensional, cooling passage formation method is applicable to two-dimensional or three-dimensional profiles within a component (into or out of the drawing figure sheet). Embodiments of the invention also fabricate non-linear cooling passage paths, which are shown in FIGS. 21-22. The ceramic insert 220 of FIG. 21 includes a non-linear post 222, with an entrance 224 and a terminus 226. The cooling passage is completed after casting by removing material from the component, so that the terminus 226 extends outside the component wall boundary defined by the ceramic inner core 144. In FIG. 22, pigtail-like cooling passage is formed by post 230, with an initial end portion 234 formed at the ceramic insert 228, and extending to a terminus 236 towards the ceramic core insert 144. The post 230 extends into a third dimension (into or out of the drawing figure sheet). Non-linear passages with serpentine paths, formed by the methods of the embodiments herein, provide for longer cooling paths within the same component volume, providing greater heat transfer surface area and longer dwell time for cooling flow, compared to a linear passage occupying the same volume in the component, at any given cooling flow velocity below the respective passage choke velocity.

Mitigation of TBC Damage During Cooling Passage Formation

Figure 23:
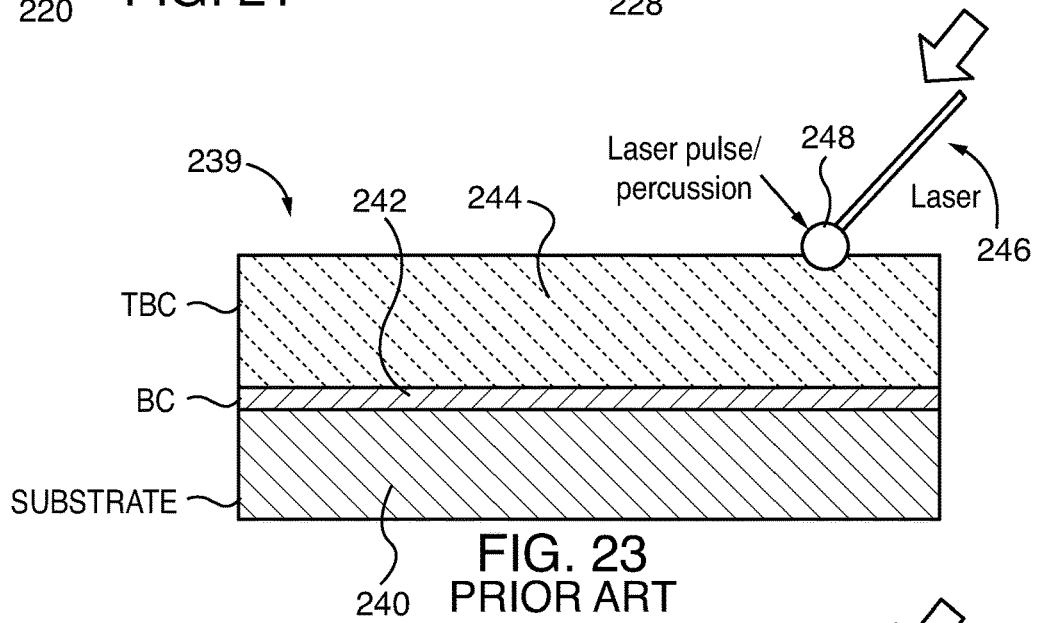
FIGS. 23-25 are elevational cross section views of a prior art method for forming cooling passages in a thermal barrier coated ("TBC") superalloy component for a combustion turbine engine, leading to undesired TBC delamination from the component substrate and its bond coat ("BC") layer around the passage margins.
Figure 24:
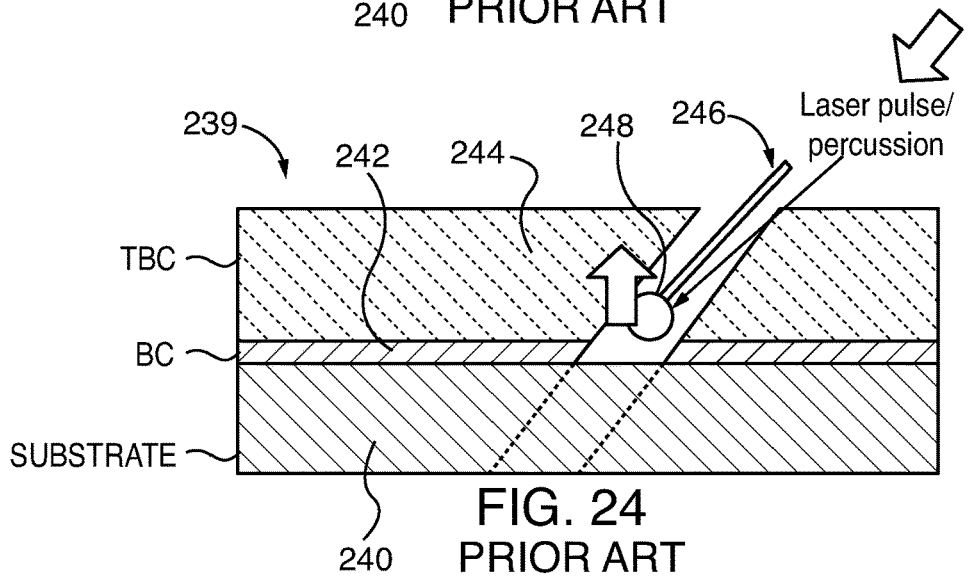
Figure 25:
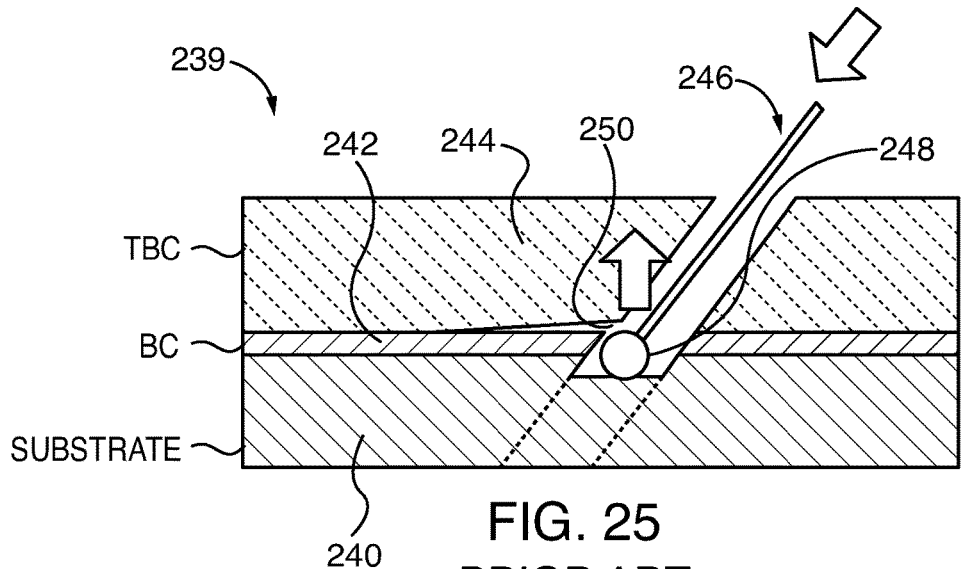

As previously noted, cooling passages formed in superalloy engine components before application of thermal barrier coating ("TBC") layers are masked to inhibit obstruction by the later applied TBC material, which is costly and time consuming. Often in the past cooling passages have been formed in superalloy engine components 239, after TBC layer application by laser ablation, such as shown in progression of FIGS. 23-25. The substrate 240 has an over layer of bond coat ("BC"), which is typically MCrAlY material, before application of the TBC layer 244. After application of the TBC layer 244, it is typically drilled with a laser 246 ablation device that uses percussions (shown schematically by the bubble 248) to pulse through the TBC 244 (FIG. 23), then the BC bond coat 242 (FIG. 24), then the substrate 240 superalloy base material to create a cooling passage/hole (FIG. 25). Delamination and/or cracking damage is commonly observed in the TBC layer 244, at its interface with the bond coat 242, as a result of the multiple percussions 248 exerting a force on the overhanging TBC in the zone labelled 250, caused by drilling through the base material 240, with the laser ablation device 246.

Figure 26:
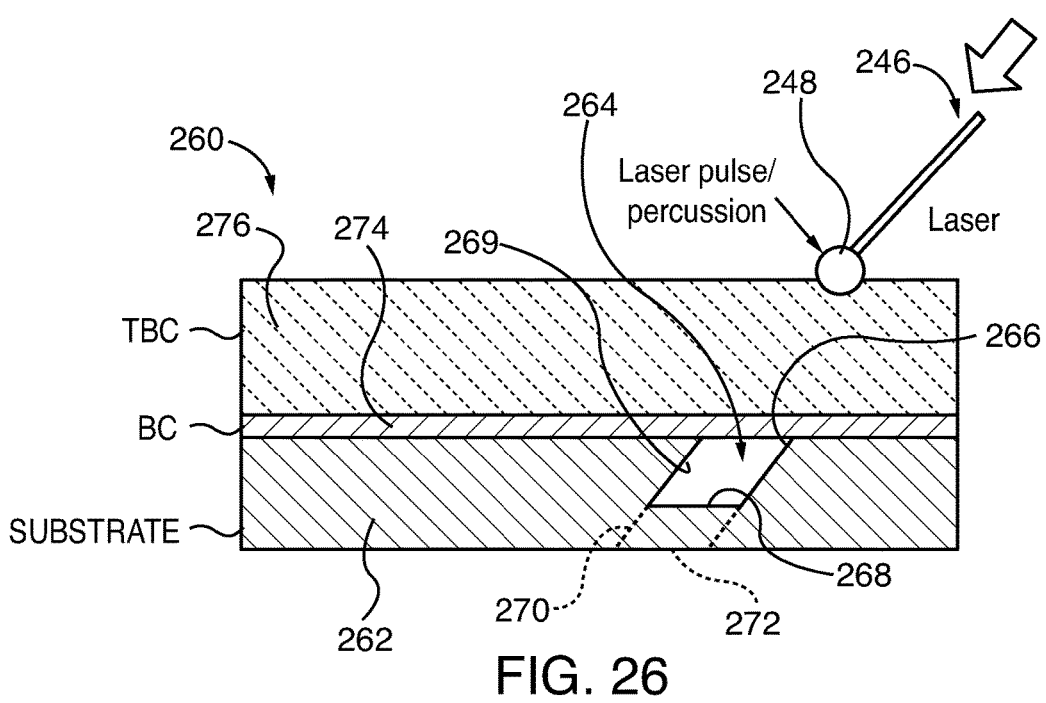
FIGS. 26 and 27 are elevational cross section views of an exemplary method for forming cooling passages in a thermal barrier coated ("TBC") superalloy component for a combustion turbine engine, where a previously formed, partial cooling passage inhibits undesired TBC delamination from the component substrate and its bond coat ("BC") layer around the passage margin, by shielding the TBC layer with an overhanging layer of superalloy material, in accordance with exemplary method embodiments of the invention.
Figure 27:
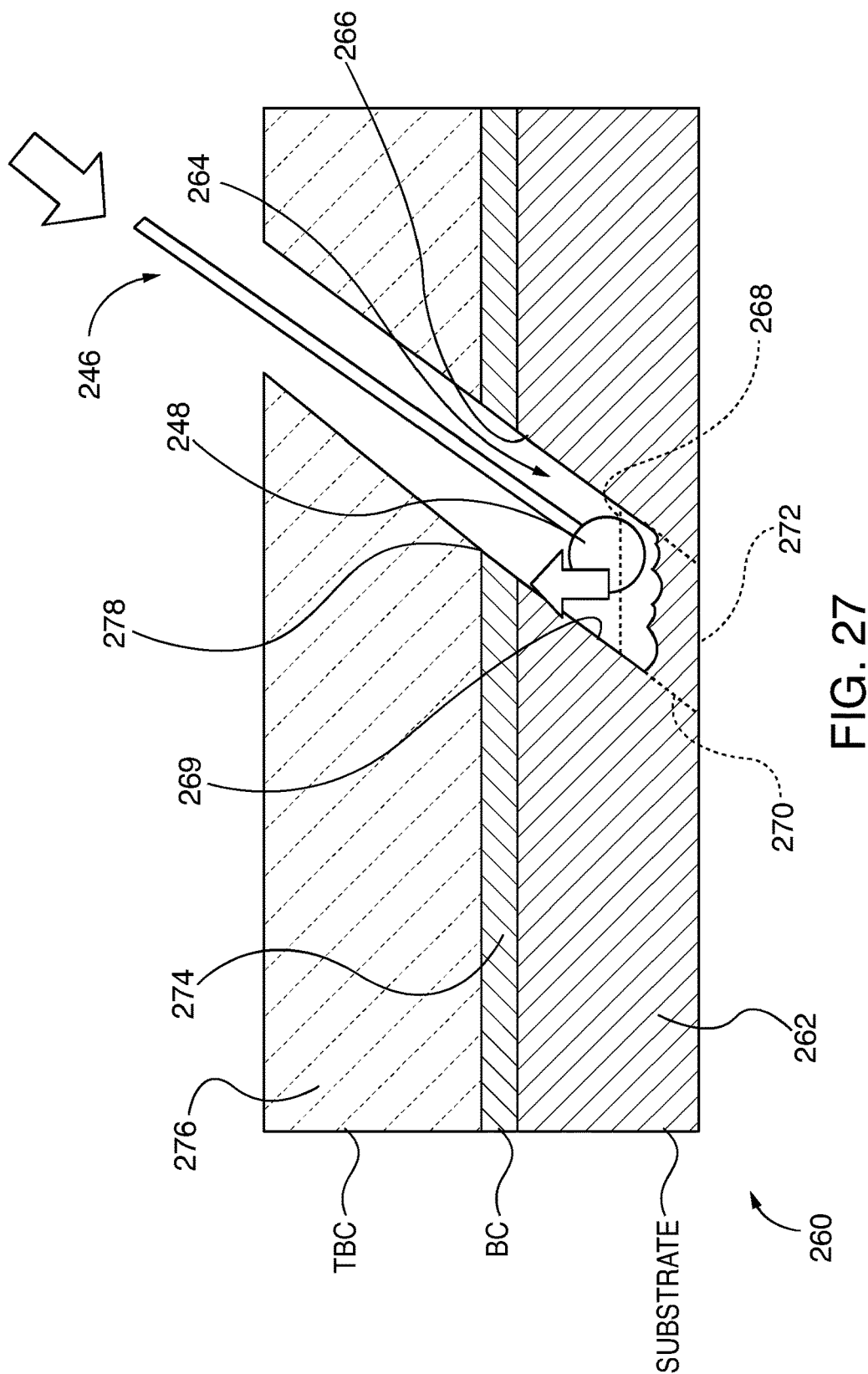

Potential damage to thermal barrier coating ("TBC") layer(s) 276 during subsequent cooling passage 270 formation is mitigated by creation of a partially completed or formed cooling passage 264 in the superalloy, turbine engine component 260, and prior to application of the TBC layer 276 on the same surface, as shown in FIGS. 26 and 27. There is less substrate 262 material (and resulting less percussions 248 generated by the laser ablation device 246) needed to drill through the remnant superalloy material below the terminus 268 of the partially completed cooling passage 264, thereby reducing opportunity to cause repetitive percussion damage to the TBC layer at the zone 278. The skewed path of the partially completed cooling passage 264 within the component substrate 262 interposes an overhanging shield layer of superalloy material 269 in the passage wall that is interposed between the laterally offset passage terminus 268 and the partial cooling passage entrance 266 that is proximate the TBC material in the zone 278.

In practicing the TBC damage mitigation method of embodiments of the invention, the partially completed cooling passage 264 is formed by any previously known cutting/or ablation method within the component surface, but beneficially such partially completed cooling passages 264 are formed in some embodiments by use of the projecting ceramic post, ceramic inserts 130 of the type shown in FIGS. 3-22 herein, during investment casting of the component 260. If a non-investment casting process is used to manufacture the engine component, the partially completed cooling passages 264 are likely formed by removing material from the component, prior to BC 274 and TBC layer(s) 276 application. The investment casting method embodiments and the TBC layer protection method embodiments are independent, but may be practiced jointly when fabricating investment cast, superalloy components for turbine engines, such as blades and vanes, having TBC layers.

FIGS. 26 and 27 illustrate embodiments of methods for forming a cooling passage 270 in an investment cast, superalloy blade or vane component for a combustion turbine engine, where the component 260 has a component wall (e.g., the superalloy substrate 262) that is delimited by respective first and second wall surfaces (e.g., the respective upper surface at the junction with the bond coat 274 and the lower surface defining the cooling passage margin 272). In these exemplary FIGS. 26 and 27 the completed cooling passage 270 will extend through the component wall (substrate 262) between its respective first and second surfaces, with the first surface forming an outer surface, for exposure to combustion gas, and the second surface forming an inner surface that is in communication with cooling channels formed in the blade or vane component 260. It is noted that the cooling passage formation methods to protect the TBC layer are applicable to other engine components, such as transitions 85 or combustor baskets within the engine 80 combustion section 84.

A partially completed cooling passage 264 is formed in a first surface of a wall of a superalloy engine component 260 for a combustion turbine engine. The partially formed or partially completed cooling passage 264 has an entrance 266 formed in the component substrate 262 first surface, which corresponds to a cooling passage inlet or outlet. The partially completed cooling passage 264 has a skewed passage path within the component wall substrate 262, having a terminus 268 that is laterally offset from the passage entrance 266, and distal the component first surface. The laterally offset passage entrance 266 and terminus 268 have an overhanging shield layer 269 of superalloy material in the wall that is interposed between the passage terminus 266 and the component first surface proximate the laterally offset passage entrance 266. While the cooling passage 270 and the partially completed or partially formed passage 264 are shown in FIGS. 26 and 27 as having a straight path, symmetrical cross section, and constant skewed path angle in the component substrate 262. In other embodiments, the cooling passage defines a non-linear path, with or without an asymmetrical, axial or radial cross section. Examples of alternative embodiment cooling passage profiles are shown in FIGS. 13-22.

A thermal barrier coating 276 is applied over the component substrate 262 first surface and the partially completed or formed passage entrance 266. The thermal barrier coating 276 comprises a known composition, thermally sprayed, or vapor deposited, or solution/suspension plasma sprayed thermal barrier coat that is applied directly to the component substrate 262 surface, or that is applied over an intermediate bond coat layer 274 that was previously applied over the component substrate surface.

An ablation apparatus, such as a pulsed laser 246 or an electric discharge machine, is used for ablating the thermal barrier coating 276 and the superalloy material in the substrate 262. The laser 246 or other ablation device is aligned with the entrance 266 of the partially completed or formed passage 264, and ablates thermal barrier coating material 276 from the partially completed or formed passage, reaching the passage terminus 268.

In FIG. 27, the cooling passage 270 is completed by ablating superalloy material out of the skewed path of the partially completed or formed passage 264, along a cooling passage path 270 from the partial passage terminus 268 to the passage exit 272 on the second surface of the component substrate 262, which forms the component 260 wall. As previously noted, the overhanging shield layer 269 of superalloy material in the partially formed/completed passage 269 inhibits damage to thermal barrier coating material 276 in the zone 278 proximate the passage entrance 266. The otherwise avoided or mitigated TBC damage in the zone 278 is caused by ejection of ablated superalloy material out of the passage entrance 266, which is shown schematically by the upwardly directed double arrow. In some embodiments, a first level of ablation energy is applied with the ablation device 246 while ablating thermal barrier coating material from the partially completed or formed passage 264, and a second, higher level of ablation energy is applied with the ablation device 246 while ablating superalloy material in the substrate 262, to complete the cooling passage 270 path. In some embodiments, the first level of ablation energy applied at a lower pulse rate and/or lower energy intensity than the second level of ablation energy. In some embodiments, the total ablation energy transferred to the component 260 during cooling passage 270 formation is insufficient to induce solidification cracking, or reheat cracking in the component during subsequent component heat treatment.

As described in the aforementioned, International Application No. PCT/US15/16318, filed Feb. 18, 2015, and entitled "TURBINE COMPONENT THERMAL BARRIER COATING WITH CRACK ISOLATING ENGINEERED GROOVE FEATURES", in some embodiments, referring to FIG. 2, additional and optional engineered groove features ("EGFs")122 are formed in the TBC layer around part of or the entire periphery of turbine component cooling passages, such as cooling passages 99 of turbine blade 92 or cooling passages 105 of the vanes 104 and 106, in order to limit delamination of the TBC over layer surrounding the cooling passage. The TBC layer at the extreme margin of the cooling passage entrance 99 or 105, on the blade 92 or vanes 104, 106 component surface can initiate separation from the metallic substrate that can spread laterally/horizontally within the TBC layer away from the hole. Creation of an EGF 122 at a laterally spaced distance from the cooling hole 99, 105 margin—such as at a depth that contacts the anchoring layer or the metallic substrate—limits further delamination beyond the groove. TBC delamination along one or more of the cooling hole 99/105 peripheral margins is arrested at the intersection of the circumscribing EGF segments 122.

Although various embodiments that incorporate the invention have been shown and described in detail herein, others can readily devise many other varied embodiments that still incorporate the claimed invention. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "supported", and "coupled" and variations thereof are used broadly and encompass direct and indirect mountings, connections, supports, and couplings. Further, "connected" and "coupled" are not restricted to physical, mechanical, or electrical connections or couplings.

What is claimed is:

1. A method for forming a cooling passage in a thermal barrier coated, superalloy component for a combustion turbine engine, the cooling passage having a passage path, including an inlet and an outlet, comprising:

forming a partially completed cooling passage in a surface of a superalloy component for a combustion turbine engine, the partially completed cooling passage having an entrance formed in the surface, corresponding to a cooling passage inlet or outlet, and a skewed passage path within the superalloy component having a terminus distal and laterally offset from the entrance in the surface, and an overhanging shield layer of superalloy material interposed between the terminus and the surface proximate the entrance;

applying a thermal barrier coating over the surface and the entrance;

providing an ablation device for ablating thermal barrier coating and superalloy material;

aligning the ablation device proximate the entrance;

ablating thermal barrier coating material from the partially completed cooling passage with the ablation device, reaching the terminus; and completing the cooling passage by ablating superalloy material out of the skewed passage path along the partially completed cooling passage from the terminus to the other of the cooling passage inlet or outlet, the overhanging shield layer of superalloy material inhibiting damage to the thermal barrier coating material proximate the entrance caused by ejection of ablated superalloy material out of the entrance.

2. The method of claim 1, wherein the skewed passage path is formed at an angle relative to the surface.

3. The method of claim 1, wherein the cooling passage defines a non-linear path.

4. The method of claim 1, wherein the partially completed cooling passage has an asymmetrical axial or radial cross section along the skewed passage path.

5. The method of claim 1, wherein the ablation device is a pulsed laser or an electric discharge machine.

6. The method of claim 5, further comprising applying a first level of ablation energy with the ablation device while ablating the thermal barrier coating material from the partially completed cooling passage, and applying a second, higher level of ablation energy with the ablation device while ablating superalloy material to complete the cooling passage.

7. The method of claim 6, wherein the first level of ablation energy is applied at a lower pulse rate than the second level of ablation energy.

8. The method of claim 6, wherein the first level of ablation energy is applied at a lower energy intensity than the second level of ablation energy.

9. The method of claim 6, wherein a total ablation energy transferred to the component during formation of the cooling passage is insufficient to induce solidification cracking in the component, or reheat cracking in the component during subsequent component heat treatment.

10. The method of claim 1, the wherein the thermal barrier coating comprises a thermally sprayed, or vapor deposited, or solution/suspension plasma sprayed thermal barrier coat that is applied directly to the surface, or that is applied over an intermediate bond coat later that was previously applied over the surface.

11. The method of claim 1, further comprising forming an engineered groove feature (EGF) in the thermal barrier coating after application of the thermal barrier coating, which circumscribes at least a portion of a periphery of the cooling passage inlet, prior to ablating the superalloy material.

12. A method for forming a cooling passage in an investment cast, superalloy blade or vane component for a combustion turbine engine, the component having a component wall delimited by first and second wall surfaces, the cooling passage extending through the component wall between the first and second wall surfaces, comprising:

forming a partially completed cooling passage in the first wall surface, the partially completed cooling passage having an entrance formed in the first wall surface, corresponding to a cooling passage inlet or outlet, and a skewed passage path within the first wall surface, having a terminus distal and laterally offset from the entrance, and an overhanging shield layer of superalloy material in the first wall that is interposed between the laterally offset passage terminus and the surface proximate the entrance;

applying a thermal barrier coating over the first wall surface and the entrance;

providing an ablation device for ablating thermal barrier coating and superalloy material;

aligning the ablation device proximate the entrance;

ablating thermal barrier coating material from the partially completed cooling passage with the ablation device, reaching the passage terminus; and completing the cooling passage by ablating superalloy material out of the skewed path, along the partially completed cooling passage path from the terminus to the other of the cooling passage inlet or outlet in a the second wall surface, the overhanging shield layer of superalloy material inhibiting damage to thermal barrier coating material proximate the entrance caused by ejection of ablated superalloy material out of the entrance.

13. The method of claim 12, wherein the component comprises an airfoil outer wall, with the first wall surface forming an outer surface, for exposure to combustion gas, and the second wall surface forming an inner surface that is in communication with cooling channels formed in the component.

14. The method of claim 12, the skewed path is formed at an angle relative to the first or second wall surface.

15. The method of claim 12, wherein the cooling passage is a non-linear path.

16. The method of claim 12, wherein the partially completed cooling passage has an asymmetrical axial or radial cross section.

17. The method of claim 12, further comprising forming the partially completed cooling passage while casting the blade.

18. The method of claim 12, wherein the ablation device comprises a pulsed laser or an electric discharge machine.

19. The method of claim 18, further comprising applying a first level of ablation energy with the ablation device while ablating thermal barrier coating material from the partially completed cooling passage, and applying a second, higher level of ablation energy with the ablation device while ablating superalloy material to complete the cooling passage.

20. The method of claim 12, wherein the thermal barrier coating comprises a thermally sprayed, or vapor deposited, or solution/suspension plasma sprayed thermal barrier coat that is applied directly to the component, or that is applied over an intermediate bond coat later that was previously applied to the component.

* * * * *